US007596523B2

(12) United States Patent
Sobel et al.

(10) Patent No.: US 7,596,523 B2
(45) Date of Patent: Sep. 29, 2009

(54) METHOD AND APPARATUS FOR NETWORK-BASED PORTFOLIO MANAGEMENT AND RISK-ANALYSIS

(75) Inventors: William Sobel, Oakland, CA (US); Alex Aleskovski, El Cerrito, CA (US); Peter Hand, Berkeley, CA (US); Zheng Liu, San Ramon, CA (US); Michael Bishopp, Lafayette, CA (US); Anton Honikman, San Francisco, CA (US); Loren Anderson, Concord, CA (US); Richard Close, Chalfont St. Peter (GB)

(73) Assignee: Barra, Inc., Berkeley, CA (US)

( * ) Notice: Subject to any disclaimer, the term of this patent is extended or adjusted under 35 U.S.C. 154(b) by 1047 days.

(21) Appl. No.: 10/655,503

(22) Filed: Sep. 3, 2003

(65) Prior Publication Data
US 2004/0210500 A1    Oct. 21, 2004

Related U.S. Application Data

(60) Provisional application No. 60/409,647, filed on Sep. 9, 2002.

(51) Int. Cl.
*G06Q 40/00* (2006.01)
*G06F 15/16* (2006.01)
*G06F 15/167* (2006.01)
*G06F 17/00* (2006.01)
*G06F 17/30* (2006.01)

(52) U.S. Cl. ............... 705/36 R; 709/201; 709/202; 709/203; 709/213; 707/1; 707/10; 707/100; 707/102; 707/204

(58) Field of Classification Search .......... 709/201–203, 709/223, 213
See application file for complete search history.

(56) References Cited

U.S. PATENT DOCUMENTS

| 5,050,088 | A | * | 9/1991 | Buckler et al. ............. 700/96 |
| 5,126,936 | A |   | 6/1992 | Champion et al. ......... 364/408 |
| 5,168,444 | A | * | 12/1992 | Cukor et al. ................ 705/1 |
| 5,186,444 | A | * | 2/1993 | Palmatier et al. ........ 270/52.09 |

(Continued)

FOREIGN PATENT DOCUMENTS

EP    0 790 568    2/1997

(Continued)

OTHER PUBLICATIONS

BEA Acquires Softport Systems to Expand Its E-Commerce Consulting And Application Development Services PR Newswire. New York: Jun. 7, 2000. p. 1.*

(Continued)

*Primary Examiner*—Daniel S Felten
*Assistant Examiner*—William E Rankins
(74) *Attorney, Agent, or Firm*—Michael A. Glenn; Glenn Patent Group

(57) ABSTRACT

The invention comprises a risk model and data, and is provided on a secure Web-based, interactive platform, whereby a user can build customized risk analyses and reports, covering multiple asset classes and markets. The invention also organizes and categorizes assets along dimensions best reflecting a user's investment process, determines risk assumed, determines sources of risk, allows viewing of a portfolio's risk exposures, identifies and quantifies sources of volatility, provides streamlined risk reporting, and provides a trade scenario utility.

24 Claims, 14 Drawing Sheets

U.S. PATENT DOCUMENTS

| | | | | |
|---|---|---|---|---|
| 5,704,045 | A | 12/1997 | King et al. | 395/235 |
| 5,806,047 | A | 9/1998 | Hackel et al. | 705/36 |
| 5,819,237 | A | 10/1998 | Garman | 705/36 |
| 5,930,762 | A | 7/1999 | Masch | 705/7 |
| 5,966,700 | A | 10/1999 | Gould et al. | 705/38 |
| 5,970,479 | A | 10/1999 | Shepherd | 705/37 |
| 6,058,416 | A | 5/2000 | Mukherjee et al. | |
| 6,078,904 | A | 6/2000 | Rebane | 705/36 |
| 6,112,243 | A * | 8/2000 | Downs et al. | 709/226 |
| 6,134,536 | A | 10/2000 | Shepherd | 705/37 |
| 6,233,566 | B1 | 5/2001 | Levine et al. | 705/36 |
| 6,317,727 | B1 | 11/2001 | May | 705/37 |
| 6,347,307 | B1 | 2/2002 | Sandhu et al. | 705/35 |
| 6,393,409 | B2 | 5/2002 | Young et al. | 705/37 |
| 6,415,267 | B1 | 7/2002 | Hagan | 705/35 |
| 6,421,653 | B1 | 7/2002 | May | 705/37 |
| 6,453,303 | B1 | 9/2002 | Li | 705/36 |
| 6,473,794 | B1 * | 10/2002 | Guheen et al. | 709/223 |
| 6,996,539 | B1 * | 2/2006 | Wallman | 705/36 T |
| 2001/0056398 | A1 * | 12/2001 | Scheirer | 705/38 |
| 2002/0046145 | A1 * | 4/2002 | Ittai | 705/36 |
| 2002/0120546 | A1 * | 8/2002 | Zajac | 705/37 |
| 2002/0147671 | A1 * | 10/2002 | Sloan et al. | 705/36 |
| 2002/0169851 | A1 * | 11/2002 | Weathersby et al. | 709/218 |
| 2003/0018766 | A1 * | 1/2003 | Duvvuru | 709/223 |
| 2003/0088489 | A1 * | 5/2003 | Peters et al. | 705/36 |
| 2003/0163479 | A1 * | 8/2003 | Mathews et al. | 707/102 |
| 2004/0006653 | A1 * | 1/2004 | Kamen et al. | 709/330 |

FOREIGN PATENT DOCUMENTS

| | | |
|---|---|---|
| EP | 0 701 717 | 4/2000 |
| EP | 1 168 212 | 1/2002 |
| EP | 1 178 416 | 2/2002 |
| JP | 2002-109207 | 9/2000 |
| JP | 2002-041454 | 2/2002 |
| JP | 2002-041804 | 2/2002 |
| JP | 2002-073968 | 3/2002 |
| JP | 2002109207 | 4/2002 |
| JP | 2002-183459 | 6/2002 |
| WO | WO 94/20912 | 9/1994 |
| WO | 00/54198 | 9/2000 |
| WO | WO 00/58900 | 10/2000 |
| WO | 00/68861 | 11/2000 |
| WO | WO 00/68852 | 11/2000 |
| WO | 00/75819 | 12/2000 |
| WO | 00/75820 | 12/2000 |
| WO | 00/75836 | 12/2000 |
| WO | 01/33402 | 5/2001 |
| WO | 01/33486 | 5/2001 |
| WO | 01/35311 | 5/2001 |
| WO | 02/07041 | 1/2002 |
| WO | WO 02/061653 | 8/2002 |

OTHER PUBLICATIONS

T spaces P Wyckoff, S W McLaughry, T J Lehman, D A Ford. IBM Systems Journal. Armonk: 1998. vol. 37, Iss. 3; p. 454, 21 pgs.*

Barra Introduces Beta Version of New Web-Based Risk Analysis Tool?BarraOne (TM) PR Newswire. New York: Jun. 18, 2002. p. 1.*

Wahli, et al.; "Web Services Wizardry with WebSphere Studio Application Developer"; Apr. 2002, IBM; retrieved from the internet: http://vvww.redbooks.ibm.com/redbooks/pdfs/sg246292.pdf.

Nishiyama N.; One Idea of Portfolio Risk Control for Absolute Return Strategy Risk Adjustments by Signals from Correlation Behavior; Physica A; Dec. 2001.

Jobst, N.J., M.D. Horniman, C.A. Lucas and G. Mitra; Computational Aspects of Alternative Portfolio Selection Models in the Presence of Discrete Asset Choice Constraints; Quantitative Finance; Sep. 2001.

K.L. Teo and X.Q. Yang; Portfolio Selection Problem With Minimax Type Risk Function; Annals of Operations Research; 2001.

D. Sornette; Large Deviations and Portfolio Optimization; Physica A; Jul. 15, 1998.

Shin-Yuan Hang, Ting-Peng Liang and V.W.C. Liu; Integrating Arbitrage Pricing Theory and Artificial Neural Networks to Support Portfolio Management; Decision Support Systems; Nov. 1996.

G.J. Deboeck; Applications of Advanced Technology for Trading, Risk and Portfolio Management; 1994.

Keith Decker, Katia Sycara and Dajun Zeng; Designing a Multi-Agent Portfolio Management System.

Wlodzimierz Ogryczak and Andrzej Ruszczynski; From Stochastic Dominance to Mean-Risk Models: Semideviations as Risk Measures; Jun. 1997.

Vijay Jog, Ignacy Kaliszewski and Wojtek Michalowski; Using Trade-off Information in Attributes' Investing; Apr. 1998.

Bauerle, N.; Risk Management in Credit Risk Portfolios with Correlated Assets; Insurance Mathematics & Economics; Apr. 19, 2002.

C. Ratiu-Suciu and D. Iacob; Integrating the Risk into a Simulation Model in the Stock Market Case; Economic Computation and Economic Cybernetics Studies and Research; 2001.

C. Chiarela and Xue-Zhong He; Asset Price and Wealth Dynamics Under Heterogeneous Expectation; Quantitative Finance; Sep. 2001.

Steinbach, M.C.; Markowitz Revisited: Mean-Variance Models in Financial Portfolio Analysis; SIAM Review; 2001.

Nagai, H.; Risk-Sensitive Portfolio Optimization with Partial Information; 2000.

H.R. Nemati and L.S. Iyer; an Intelligent Decision Support System Prototype for Asset Allocation; 1999.

T.R. Bielecki, S.R. Pliskas, and M. Sherris; Risk Sensitive Asset Allocation; Journal of Economic Dynamics and Control; Jul. 2000.

Yusen Xia, Baoding Liu, Shouyang Wang, and K.K. Lai; A Model for Portfolio Selection with Order of Expected Returns; Computers & Operations Research; Apr. 2000.

J. Beirlant, Y. Goegebeur, R. Verlaak, and P. Vynckier; Burr Regression Portfolio Segmentation; Insurance Mathematics & Economics; Dec. 1998.

M. Rajan and K. Gnanendran; Alternative Risk Measures in Portfolio Selection: Variance vs. Semivariance; 1997.

A.S. Mello and H.J. Neuhaus; A Portfolio Approach to Risk Reduction in Discretely Rebalanced Option Hedges; Management Science; Jul. 1998.

Vacca, L.; Managing Options Risk with Genetic Algorithms; 1997.

P. Kowalik and Badania Operacyjne i Decyzje; Application of Modified Semivariance to Estimating Investment Risk; 1995.

B.R. Feiringi, Wuilam Wong, Maychi Poon, and Yan Chong Chan; Portfolio Selection in Downside Risk Optimization Approach: Application to the Hong Kong Stock Market; International Journal of Systems Science.

BarraOne; Security and Reliability; Barra, Inc.; 2002.

BarraOne; Barra Integrated Risk Model; Barra, Inc.; 2002.

BarraOne; One Risk Solution for All presentation; www.barra.com.

BarraOne; One Risk Solution for All; Barra, Inc.; 2002.

Askari.html; Enterprise Wide Risk Management Solutions; Risk Management Solutions.

Askari—Enterprise Wide Risk Management Solutions; Askari a State Street Business; Products and Services; 1998-2002 Financial Engines, Inc.

Financial Engines; Retail User; Sign Up Today!; 1998-2002 Financial Engines, Inc.

Financial Engines—Are you on track to meet your goals?; 1998-2002 Financial Engines, Inc.

Fidelity.html; Fidelity.com home page.

Financial Engines; Log in here!; 1998-2002 Financial Engines, Inc.

Askari—Enterprise Wide Risk Management; Askari a State Street business; Company Information.

Askari—Enterprise Wide Risk Management Solutions, Askari a State Street business; Products and Services; Overview.

Compass Product Summary; Copyright 2002 Wilshire Associates Incorporated.

RiskMetrics Group; risk metrics.html.

Wilshire Compass; Risk Management Analytics; risk mgmt.htm; Copyright 2001 Wilshire Associates Incorporated.

Financial Engines—Sitemap; Welcome—Investment advice—Personal info—Inventor education, 1998-2002 Financial Engines, Inc.

RiskMetrics Group; www.riskmerics.com; Technical Documents.

Financial Engines—help share your financial future; Welcome—Investment advice—Personal info—Investor education; 1998-2002 Financial Engines, Inc.

RiskMetrics Group; www.riskmerics.com; Research Working Papers.

Financial Engines—Are you on track to meet our goals?; Signup; 1998-2002 Financial Engines, Inc.

International Search Report.

* cited by examiner

METHOD AND APPARATUS FOR NETWORK-BASED PORTFOLIO MANAGEMENT AND RISK-ANALYSIS This application claims priority and incorporates by reference the Provisional Application No. 60/409,647 filed Sep. 9, 2002.

BACKGROUND OF THE INVENTION

1. Technical Field

The invention relates to the delivery of risk analytics over the Internet in a Web hosted environment. More particularly, the invention relates to a method and apparatus for network-based portfolio management and risk-analysis.

2. Description of the Prior Art

Modern portfolio management and risk-analysis tools are dedicated, separate investor applications. As such, there is typically a suite of application specific software that the user must install and maintain, thus slowing application installation at a user location and complicating user support. Further, in such systems data and risk models are not integrated into a single application, thus presenting significant integration challenges, and obscuring potential investment and risk insights.

It would be advantageous to provide a method and apparatus for network-based portfolio management and risk-analysis that offers personalized analysis, such that a user can explore the risk characteristics of his portfolio along the dimensions that best reflect his investment strategy. In such case, the user could apply risk where he wanted it, and minimize risk where he did not want it.

It would also be advantageous to provide a method and apparatus for network-based portfolio management and risk-analysis that offers flexible risk reporting, such that a user can customize views of risk to meet his firm's or client's requirements using simple point-and-click commands for tailored, automated risk reporting.

It would also be advantageous to provide a method and apparatus for network-based portfolio management and risk-analysis that offers asset class integration, such that a user can manage equity, fixed income, or a blend of both using industry standard risk models and analytics for a comprehensive view of risk.

It would also be advantageous to provide a method and apparatus for network-based portfolio management and risk-analysis that offers portfolio aggregation, such that a user can organize portfolios any way he chooses, and then roll up or drill down to view risk and its underlying sources at any level of aggregation.

It would also be advantageous to provide a method and apparatus for network-based portfolio management and risk-analysis that offers lower operating costs, such that a user can minimize operating expenses and technology challenges by using a browser-based technology.

It would also be advantageous to provide a method and apparatus for network-based portfolio management and risk-analysis that offers faster implementation, such that a user can reduce system implementation time and data integration challenges through an integrated application, model and data.

SUMMARY OF THE INVENTION

A method and apparatus for portfolio management and risk-analysis, incorporating an exemplary industry-leading risk model and data, is provided on a secure Web-based, interactive platform, whereby a user can build customized risk analyses and reports, covering multiple asset classes and markets. The method and apparatus further allows organizing and categorizing assets along dimensions best reflecting a user's investment process, determines risk assumed, determines sources of risk, allows viewing a portfolio's risk exposures, identifies and quantifies sources of volatility, provides streamlined risk reporting, and provides a trade scenario utility.

The risk model comprises a logical architecture having six layers: User Agent (UA), HTTP Application Layer (HAL), Business Object Layer (BOL), Analytics Layer (AL), Infrastructure Services (IS) layer, and Data Access (DA) layer. The UA is a browser based application that accepts user requests. The HAL interprets the request and determines what operations are necessary. The BOL houses the BDT, which processes the data. The AL performs operations necessary for the BDT. The IS layer implements the functional requirements. Lastly, the DA layer stores data.

DETAILED DESCRIPTION OF THE INVENTION

Glossary of Terms

Figure 1:
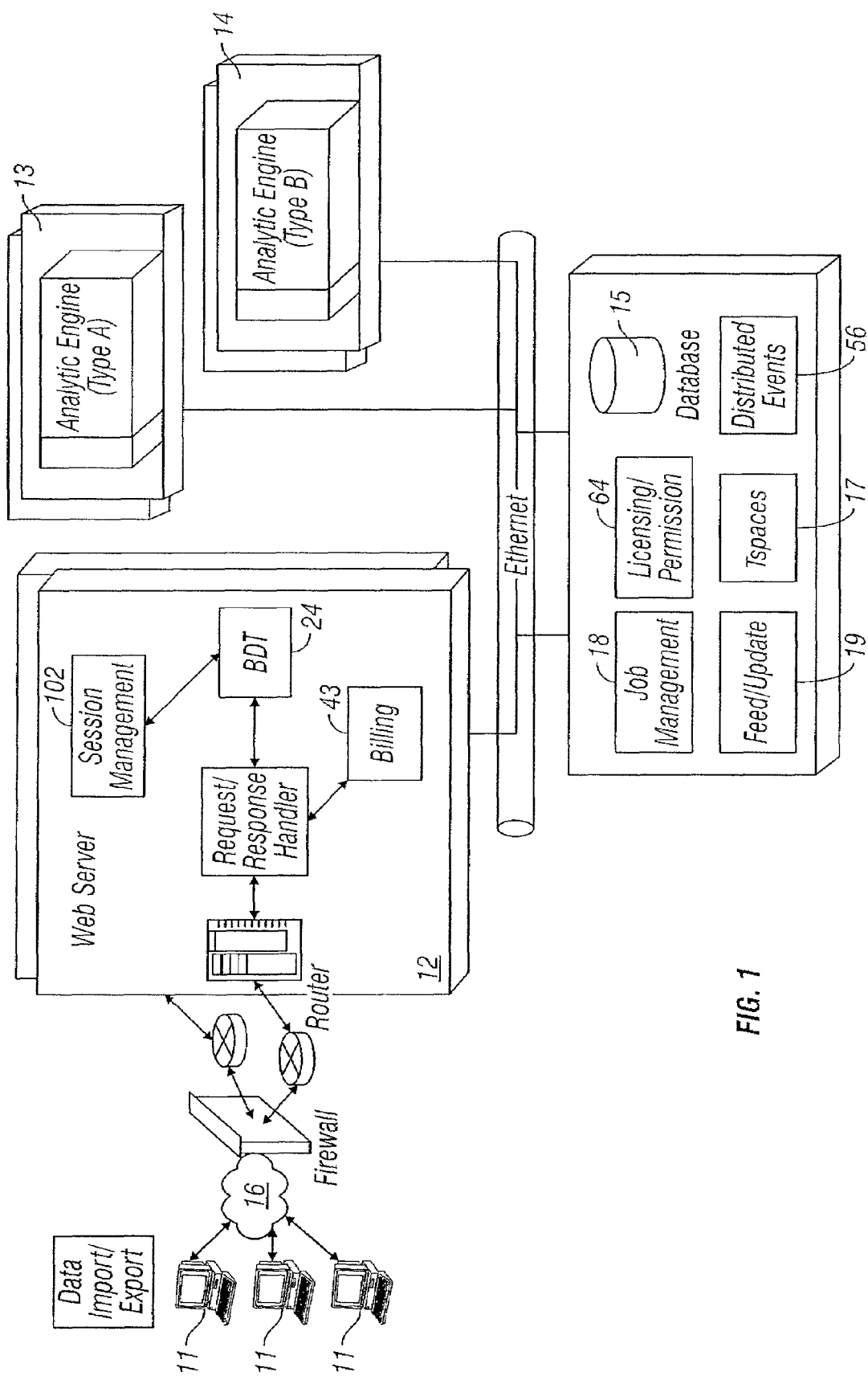
FIG. 1 is a block schematic diagram that shows the physical architecture of a system for portfolio management and risk-analysis according to the invention.

The following glossary of terms is provided in connection with the discussion herein:

AI: Analytic Interfaces.

Analytic Engine The process responsible for performing various financial calculations.

Analytic Server: A machine in the second physical tier.

Application Server: A machine in the first physical tier, which handles HTTP requests.

Binding: A concrete protocol and data format specification. For example, SOAP binding for Event means event objects are encoded in SOAP protocol format.

BDT: Developers Toolkit. An interface that provides risk analytics and asset detail. BDT provides interfaces and analytics for the application. This is the public interface that can be used by external clients as well.

BOL: Business Object Layer.

Cash Flow Instruments: Financial instruments whose present value is determined by known future cash flows. That is, most instruments other than equities and composites.

Computation Engine: A process (actually part of the RMI Infrastructure) that runs on the analytic server. All BOL server-side code runs in the address space of this process.

CSS: Cascading Style Sheets is mechanism for adding style (e.g. fonts, colors, spacing) to Web documents.

Custom Tags Custom Tags are the mechanism provided by JSP technology for defining customized, declarative, and modular functionality for use by JSP pages.

EJB: Enterprise Java Beans (EJB) refer to the server-side Beans as specified in J2EE architecture. The EJB Server is different from the Web Server.

Event: An abstract, typed definition of a business operation and its associated input/output data. Specifically, each BOL event is mapped to a BOL API function. There are two classes of BOL events: state-change events and state-query events. With regard to the HAL, an event is a type, operation, and possibly context information. Events can be combined into groups for serialized operations.

Event Bundle: A sequence of events whose ordering must be preserved during processing.

Event, Dispatch: To dispatch an event means to invoke a business operation through a transport mechanism. Examples of transport include load-balanced RMI, custom RPC over socket, SOAP over HTTP, reflection, RPC over JMS, etc.

Event HAL concept: the most granular piece of an HTTP request that is manipulated by HAL. An event is either a request for data (usually) computed, or a command that changes database or session state.

Event Bundle HAL concept: a group of events that all belong to one HTTP request (there may be other Event Bundles in the same request). There may be a required ordering of Events in a Bundle.

Event Definition: A definition of an Event, possibly in XML, within the HAL. The attributes of the Event Definition that are of interest to the BOL are: method name, argument definitions (name, data type, optionality) and a local vs. remote configuration directive.

ERTest: part of the TRAM infrastructure, to be used for batch computation of Fixed Income prices and exposures.

HAL: HTTP Application Layer. This is a layer that resides next to the Web server and processes the requests from the client. The term HAL can be used interchangeably with the Framework component described in this document.

Hosted Implementation: A system configuration that has hardware physically located at the customer's site.

GUI: Graphical user interface.

JSP: Java Server Pages is a technology that allows mixing of html and Java Beans code to generate dynamic content for Web clients.

Namespace: A method for "qualifying element and attribute names used in XML documents by associating them with namespaces identified by URI references".

PSS: Persistent Session State.

Persistent Session State: The set of all data, belonging to an HTTP session, that the BOL must have access to in order to be correct.

Preferred Server An attribute of a session, supported by the RPC Infrastructure. The preferred analytic server for a request is the server that handled the previous request for that session.

Responsible Server An attribute of an Event Bundle, while it is being evaluated. The analytic server which is evaluating the remote part of the Event Bundle.

RPC Infrastructure: A subsystem belonging to the infrastructure group, responsible for managing remote Event-Bundle invocation and progress monitoring.

Serialization/Deserialization: In this document, serialization does not necessarily mean the use of the java.io.Serializable interface—it could also mean use of the java.io.Externalizable interface, or a homegrown mechanism.

Servlet: Java programs on the server side that can be directly invoked in response to certain actions from the user in the browser.

SOAP Simple Object Access Protocol: is an XML based lightweight communication protocol. It has two sub protocols: SOAP Envelope (an application layer protocol), and SOAP Encoding (a presentation layer protocol). Originally envisioned to encapsulate and exchange RPC calls in a heterogeneous network environment, SOAP also includes an HTTP extension framework.

Template A template is a view of the application model. XML is chosen as the binding because it's hierarchical, and high quality XML parsers are freely available.

Stickiness: Also known as affinity. Some mechanism that tries to direct a request to the machine that handled the previous request in the same session.

Strategy: The combination of all user-definable settings that affect the results of a risk computation.

Template: A template is a means to assemble different JSP pages together based on the specific request. Templates provide a mechanism for sharing a common layout for different pages and for sharing common JSP pages as well.

TSpaces: A shared object product from IBM based on Linda. It provides the ability to share objects between processes, acting as an in-memory shared database with event notification.

User Agent User Agent refers to the browser or any other front-end that uses the application.

Web Server The process that is responsible for interpreting incoming HTTP requests from the browser.

XML Schema: XML Schema language offers "facilities for describing the structure and constraining the contents of XML 1.0 documents, including those which exploit the XML Namespace facility. The schema language, which is itself represented in XML 1.0 and uses namespaces, substantially reconstructs and considerably extends the capabilities found in XML 1.0 document type definitions (DTDs)." The language consists of a structure specification and a data type specification, and is expected to replace DTD.

XSL: "Extensible Stylesheet Language (XSL) is a language for expressing style sheets. It consists of three parts: a language for transforming XML documents [XSLT]; an XML vocabulary for specifying formatting semantics [XSL] and a syntax for addressing parts of a document [XPath]. An XSL style sheet specifies the presentation of a class of XML documents by describing how an instance of the class is transformed into an XML document that uses the formatting vocabulary."—W3C XSLT: A language for transforming XML documents into other XML documents, or other types of documents, e.g. HTML documents. See [XSL].

XSL FO: [XSL] Formatting Objects is a set of typographic abstractions available to presentation designer. Drawing from work on [CSS] and DSSSL (Document Style Semantics and Specification Language), XSL attempts to address styling in both print media and scrollable document windows.

Zoning: Specialization of calculation.

Notational Conventions

The following namespace prefixes are used herein for schema definition:

| Prefix | Namespace uri | Definition |
| --- | --- | --- |
| xsi | http://www.w3.org/1999/XMLSchema-instance | Instance namespace as defined by XSD |
| xsd | http://www.w3.org/1999/XMLSchema | Schema namespace as defined by XSD |
| SOAP-ENV | http://schemas.xmlsoap.org/soap/envelope/ | Namespace for SOAP envelope |
| SOAP-ENC | http://schemas.xmlsoap.org/soap/encoding/ | Namespace for SOAP serialization |
| tns | The "this namespace". | tns prefix is used as a convention to refer to the current document. |

Architectural Overview

Figure 2A:
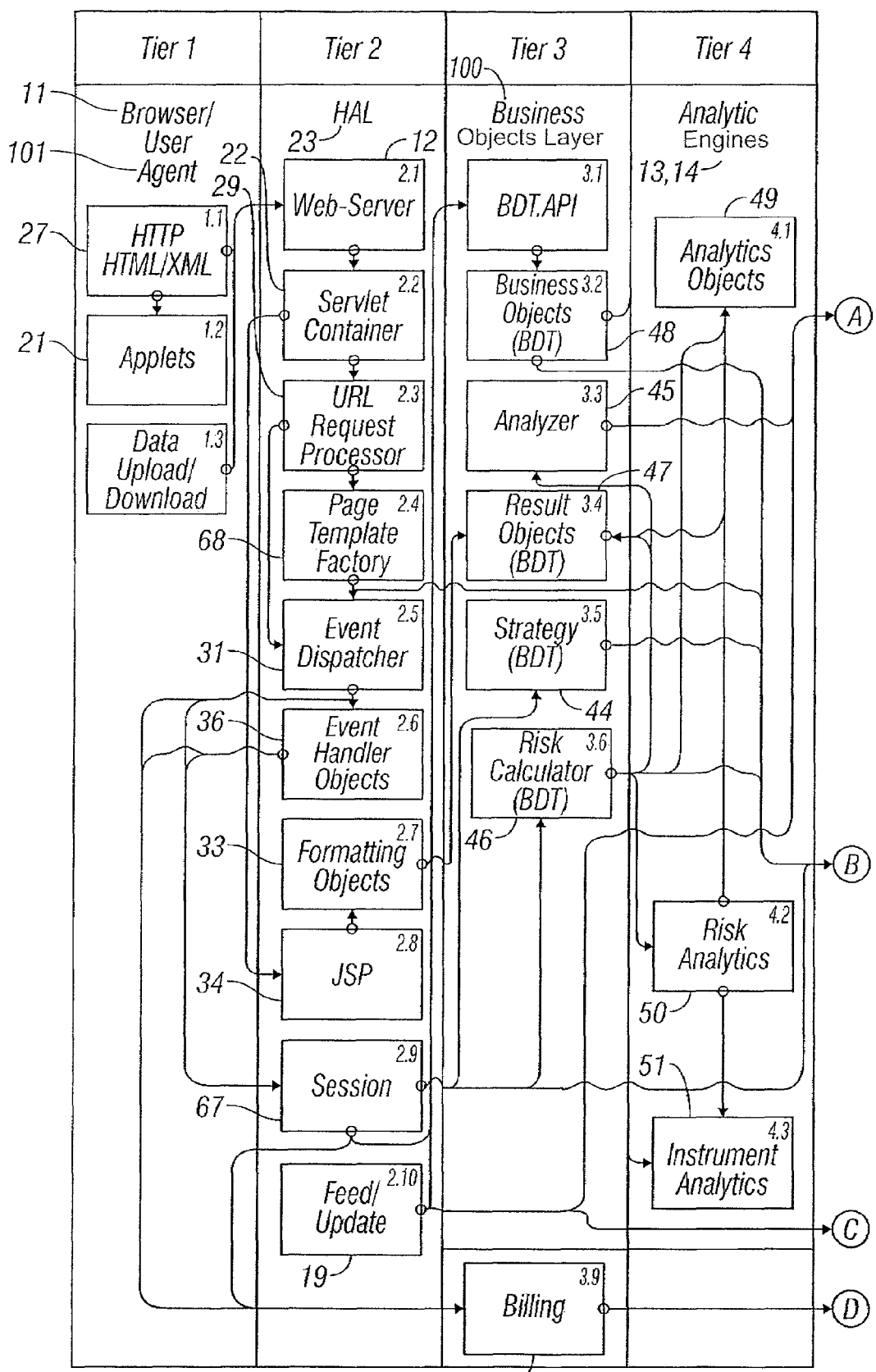
FIG. 2 is a block schematic diagram showing the logical architecture of a system for portfolio management and risk-analysis according to the invention.
Figure 2B:
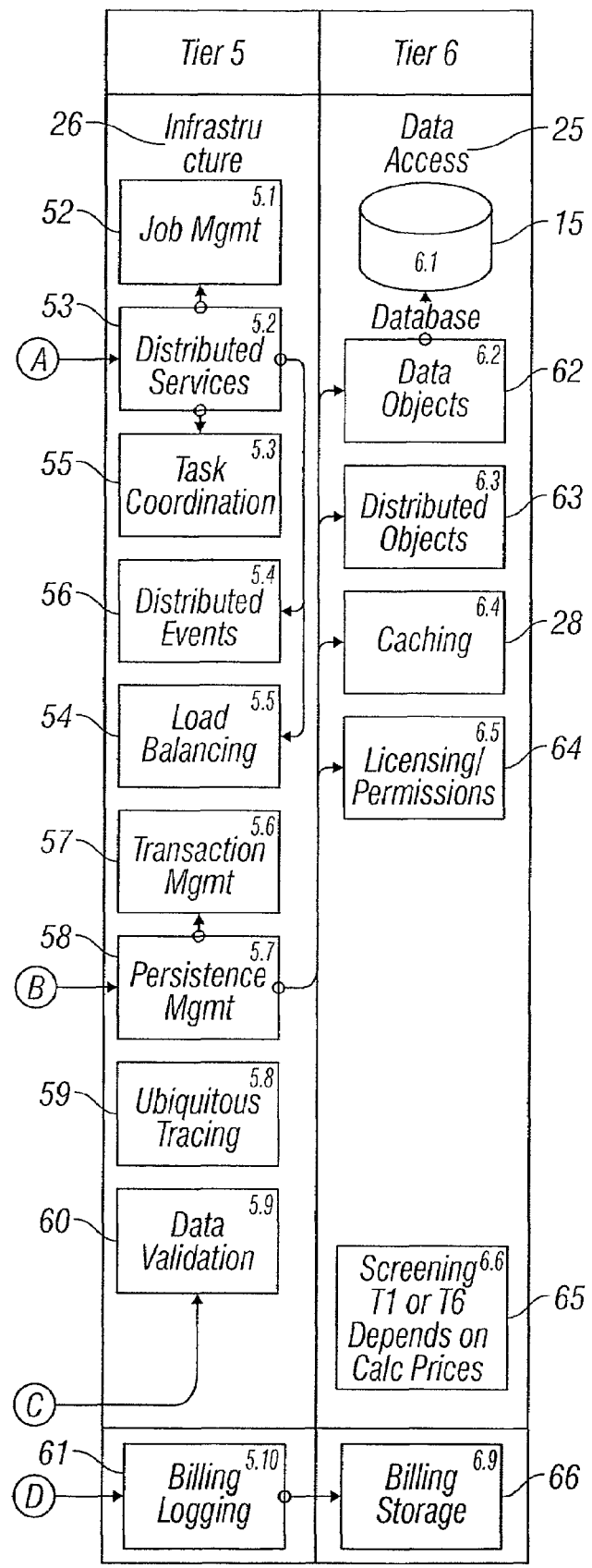

The architecture is discussed herein in two sections: physical architecture (see FIG. 1) and logical architecture (see FIG. 2).

The physical architecture pertains to processes and how the work is distributed. It also contains the set of logical packages that reside within each process.

The logical architecture is concerned with the subsystems or packages that make up the components of the system. A component can reside in multiple processes and present an interface to other packages.

The dependencies of the packages are identified and a detailed discussion follows.

The presently preferred embodiment of the invention is built on an N-tier framework made up of the following components (see FIG. 1):

A front-end browser 11 and a Web server 12 that contains an application layer and multiple analytic engines 13, 14 distributed on multiple machines. There are other service processes as well that provide some infrastructure functionality, such as feeding data into the system and scheduling jobs. The other components defined in the physical architecture provide transactional persistence, using a database 15 and a shared objects mechanism similar to tuple spaces.

The first component is a front end GUI residing in a browser 11. The two preferred browsers at this time are Microsoft Internet Explorer and Netscape Navigator. Both of these browsers offer similar functionality, but differ in subtle ways that must be accounted for in the final design of the application.

The browser 11 has a number of extensions that target Java Applets 21 as a potential candidate for implementation. These applets 21 might require an extended JRE (Java Runtime Environment) to provide all the necessary functionality. The application should require the thinnest possible client.

Communication between the browser 11 to the hosted system requires the browser 11 to use the public Internet or a dedicated private network 16. The requests arrive at the computation-hosting center and are sent to one of a number of Web servers 12 in a server farm. In some embodiments, the connection between the browser 11 and the Web server 12 requires a sticky session, meaning that one browser 11 always talks to one Web server 12 for the life of the session.

The Web server 12 itself (see FIG. 2) is a standard piece of technology that is purchased or licensed from a vendor. It provides standard HTTP functionality and the necessary performance and tools to meet the requirements of the system. Communication between the browser 11 and the Web server 12 are preferably encrypted using SSL 3.0 or above. Additional physical and application security measures are taken to safeguard client data.

The Web server hosts a servlet container 22. This layer is referred to as the HAL 23. The HAL receives requests from the Web server 12 and, in turn, sends back HTML 27 or XML 27 replies. The details of this process are discussed further below in connection with the logical architecture.

The processing of the operations occurs in the BDT 24. The actual computation occurs either in the same process as the HAL 23 or in other processes that serve as the Analytic Engines 13, 14. The Analytic Engines 13, 14 perform either general or specific operations and can also be assigned the duty of participating in batch processing. The determination of the locality of processing and what must be performed as batch versus real-time is decided using profiling and scaling considerations.

To perform the batch processing a set of scheduling processes must exist to coordinate the long running jobs for specific times of the day or as soon as possible. Jobs originate from internal and external sources. In other embodiments, performance attribution and simulations are added. To implement these resource intensive tasks, they must be scheduled by the user to occur at either predefined intervals or when the system has resources. Internal jobs scheduling occur in response to an update to data. This, in turn, causes composites and benchmarks to be recalculated.

Data access 25 is performed using a relational database 15. At present the architecture is database vendor neutral, the only requirement is that it provides a JDBC interface. This suffices for transactional persistent data. The system also requires more temporary data, such as job information and tasks. At present Tspaces 17 (see FIG. 1) or the equivalent to coordinate the more transient elements of the system. TSpaces 17 provide a shared object metaphor to allow processes to access state in a synchronous manner. Profiling and sizing considerations determine the placement of individual data items with respect to the mechanism.

Logical Architecture

The logical architecture of the preferred embodiment is built upon a six-tier structure (FIG. 2). The layers are constructed as follows from highest to lowest:

User Agent (UA) 101
HTTP Application Layer (HAL) 23
Business Object Layer (BOL) 100
Analytics Layer (AL)
Infrastructure Services (IS) 26
Data Access (DA) 25

The layers are organized to allow the presentation of services and interfaces to the layers above it. An upper layer can use the services of layers multiple levels below it, the only restriction is that the lower layers should not have any knowledge of the layers above it. The lower layers should be general enough to be tested independent of any higher layer.

The User Agent 101 is a browser-based application that is preferably made up of Applets 21, scripts, and plain HTML. The user interaction is passed to the HTTP Application Layer 23 using standard Web-Application-Server technologies, such as Apache, Orion, WebLogic, or WebSphere. At this point the control is handed to a Servlet that performs the interpretation of the request and dispatching the work to different subsystems.

The next tier gets involved after the HAL has had a chance to determine the necessary operations. These operations are currently termed Events and are stored as part of the template associated with the request. The Events thereafter are dispatched by the HAL and invoke the BDT to perform certain actions. Examples of the actions include calculating certain values and making requests to select information from the database. All these operations are performed via a set of interfaces, i.e. the BDT.

The BDT, in turn, either calls the Analytics Layer directly in the same process or in a remote process, depending on performance analysis which is performed at a later time. The Analytics Layer, in turn, invokes JNI libraries or Java Analytics to perform the operations necessary for the BDT. The data for the analytics come from the BDT or the Infrastructure Services.

The Infrastructure Services layer provides distributed processing, both remote method distribution and load balancing, as well as batch job management, and data access and caching services 28 necessary for this proper functioning of the system. These services preferably are Java based and use standard EJB technology.

The details of each tier and the subsystems that make up these tiers is expanded upon in the section below entitled:

Architecture The execution flow and data flow is discussed below in the section entitled Activity Analysis.

Physical Architecture

Refer to FIG. 1 in connection with the following discussion.

Browser

The browser 11 in the preferred embodiment is either MS Internet Explorer or Netscape Navigator. The content delivered to the browsers is via HTTP and the content is in HTML, DHTML, XML, or PDF, with Java Applets used where complexity dictates. Standards are followed as closely as possible to allow for as much browser neutrality.

Web Server

The Web server process 12 is the point of entry for an HTTP request. Within this process there is the HAL layer that provides the request for processing the reporting functionality of the application. There can be multiple Web servers running for scalability. Load Balancing at the Web server level is achieved through hardware.

Analytic Engine

The analytics engine 13, 14 supports all calculations. This process can be specialized to perform a task, such as optimization, or to provide a single time slice. It is distributed with multiple instances capable of performing a single task. Fault tolerance considerations make it necessary for an operation to be performed on any one of the processes capable of performing a given task.

For long running externally initiated operations, such as optimization, the analytic engine processes the operation asynchronously with respect to the original request. The results are associated with an identifier to allow the initiator to retrieve them at a later time.

For internally initiated long running batch jobs, e.g. composite and fixed income exposure calculations, the scheduler organizes the list of tasks required to complete the operation. These internally initiated jobs occur at a predefined time or in response to an internal update event. The system must allow for synchronization of the results in the various engines when the processing is complete.

Market conditions must also be synchronized with respect to the analytic engines. It is a matter of choice if it is required that the conditions be synchronized in real-time or only upon session initiation. Scaling and performance considerations determine the most efficient data handling.

Job Scheduler

As a piece of the Infrastructure, the job scheduler 18 provides a service to all packages requiring distributed or long running jobs. The architecture has identified many areas where the operation may result in a computation that takes longer that the HTTP time-out and might even last longer than the session itself.

Jobs can also originate from update or feeder events that occur from within the system itself. These jobs can be batch processes for computing exposures of composite securities and benchmarks or fixed income exposures, for example.

Update and Data Feed

Data arrive from a data production facility, such as BARRA. At present there is no defined business cycle to coordinate the arrival of the data to the system. By the time data are made available to the system, it is assumed that the data have gone through a schema and integrity validation. A design goal of the architecture is that the validation mechanisms for updates and user data imports are shared as much as possible.

The Update mechanism 19 updates the database and posts the necessary coarse granular messages to be picked up by the Analytics data cache engines to refresh themselves on a pull basis. It is very difficult for the system to proactively preprocess exposures and composites for every user taking their specific inputs and priorities into account. To perform user specific pre-processing, it is not only has to depend on data updates but also on any optional user specific updates to trigger the pre-processing.

A normal update/feed triggers pre-processing for data production facility data only. The presently preferred embodiment provides an explicit Process Database option and potentially an automation capability to the users to trigger their preprocessing as and when they would like. If the users explicitly do no preprocessing, they see slight performance degradation when they first use the data on a given day.

Database

In the preferred embodiment, the database 15 can be any JDBC compliant SQL database. The architecture remains as vendor neutral as possible to allow for analysis of vendor features and requirements for client hosted solutions. The current databases that may be used in connection with the invention include the following: Oracle, Sybase, DB2 and MS SQL.

Access to the Database is performed using an ORDB mapping tool. This provides a convenient method of persisting Java objects to the relational database without having to write and maintain the SQL directly in the application. It also provides an abstraction layer to the various database vendors.

Shared Distributed Objects (TSpaces)

TSpaces 17 are currently used for temporary data storage and process coordination. TSpaces provide a shared object framework that is derived from Tuple Spaces. The framework is a set of objects that reside in a conceptual space. The processes that use these objects can either take an object from the space or read an object state without removing it. On the other side any process can write an object to the space.

If no object matching the reader's pattern exists in the space, the process can either block or register for asynchronous notification when an object is available.

TSpaces take the tuple space concept further by allowing multiple reads and takes from the space. TSpaces also provide much richer query syntax than either Tuple Spaces or Java Spaces.

Using TSpaces solves some of the distributed processing and state issues that have arisen during the architectural process. It provides the basic building blocks for synchronous state management and notification.

Logical Architecture—Detailed Discussion

Tier Diagram

A brief description of the major responsibilities of the package and what services it provides is given for each of the subsystems. The following sections also discuss the relation to other packages in the architecture and the dependencies between them (see, also, FIG. 2).

Data flow is detailed in the section entitled Activity Analysis.

Web Server/HTTP Application Layer

Figure 3:
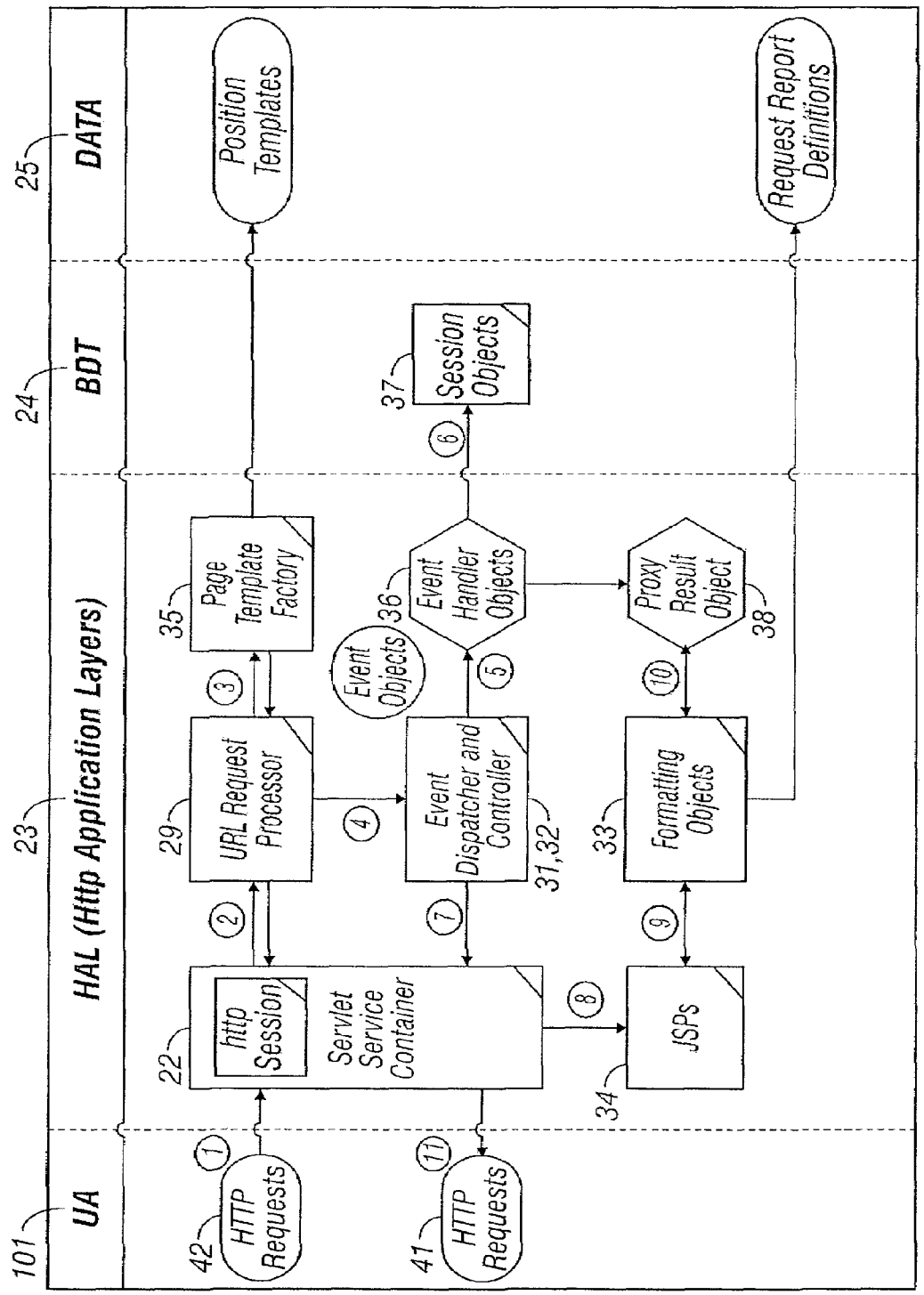
FIG. 3 is a block schematic diagram showing an HTTP application layer for a system for portfolio management and risk-analysis according to the invention.

See FIG. 3 in connection with the following discussion. The order of process flow within this layer is indicated in FIG. 3 for purposes of example and explanation by numbers which appear within circles and which, when referenced herein, are shown enclosed between parentheses, e.g. (1).

User Agent

The user agent 101 is responsible for gathering the user input and rendering the server response. It can optionally provide local formatting and validation if deemed necessary. The inputs to the user agent can be an HTTP request 42, user interactive input, or a script. In response to the input the user agent sends back an HTTP request 41 to the server.

The user agent can be implemented, for example, in any one of the following different methods: HTML/CSS, XML/XSLT, Applet with Java plug in, Applet w/o Java plug in, and/or HTML using Jscript, and DOM.

Http Application Layers

Servlet Container

The Servlet Container (SC) 22 is responsible for passing User Agent HTTP requests 42 (1) to the URL Request Processor 29 (2), which in turn uses the Event Dispatcher 31 and Event Controller 32, and gets the JSP pages 34 and results that must be used to fill the response. SC is responsible for executing the JSP pages, managing the HTTP session, and invoking HAL. The Servlet Container is provided by the application server.

There is an array of choices for the Application Server, including for example WebLogic, Orion, and WebSphere.

URL Request Processor

The Request processor 29 contains logic that gets executed for each request. It is responsible for getting template page (3) from the Page Template Factory 35 and constructs the list of events based on the HTTP request and invokes the Event Dispatcher and Controller 31, 32 (4).

Page Template Factory

Page Template Factory (PTF) 35 is responsible for retrieving, parsing, and validating the template pages. It is also responsible for assembling the leaf pages and caching the template pages for efficiency. The request URL and the information inside the template are used to construct the set of JSP pages and their layout for a given request. Extended JSP DTD and XML can be use for this implementation.

Event Controller and Dispatcher

ECD 31, 32 is responsible for analyzing the Event bundle and constructing the necessary Event Handler Objects (EHO) 36 (5). It is responsible for creating event queues as needed and handling the events synchronously or asynchronously.

Event Handler Objects

The Event Handler Objects 36 is responsible for talking to BDT Session objects 37 (6) and making synchronous or asynchronous calls to the BDT. Returned from the BDT are the Proxy Results Object 38 to the Request Processor which, in turn, places the Proxy Result Object in the HTTP session (7) to make it available for the JSP page when it is processed.

JSP

Java Server Pages (JSP) 34 (8) are presently used to generate HTML output. Each request results in the assembling of several JSP pages together, e.g. Banner, Portfolio Tree, and specific report body. JSP pages invoke the formatting objects (9) which, in turn, get the Proxy Result Object (10) as input from session variables and give the final display output. Billing Events 43 could also be generated here.

Formatting Objects

Formatting Objects 33 are responsible for formatting the results taking into account, for example, locality, date format, currency format, and comma delimiter. There could be different formatting objects for producing specific format reports, such as HTML, PDF, XLS, as well as for generating graphs.

BDT

Session Objects

Session Objects 37 are used to hold on to User Session information such as Portfolio holdings and strategy. The Event Handler uses the Session object to get the state and invoke the BDT. It is presently preferred to save the entire Strategy object, user modified as well as unmodified portions, in Session object.

Overview of the Process Flow

Refer to FIG. 3 in connection with the following discussion.

1. Incoming HTTP request received by the Servlet Container (SC). SC parses the request into URL and parameters, and stores them as HTTP session variables.
2. SC invokes the URL Request Processor (URP).
3. URP retrieves response page from the Page Template Factory (PTF); constructs pages flow and event objects. URP retrieves parameters from SC when necessary. PTF is responsible for the retrieval, parsing, validation, assembly, and caching of template pages.
4. Event object bundles and response page are passed to Event Controller and Dispatcher (ECD).
5. ECD instantiates Event Handler Objects (EHO), and dispatches events to them, either synchronously or asynchronously. Event queuing can be FIFO or managed.
6. EHOs instantiate Proxy Result Objects (PRO), adds them to the session variables, and invokes BDT to handle events. If BDT returns reference to actual result object, PRO is populated with the reference. If actual results are not returned quickly enough, an IOU is returned (discussed below).
7. ECD returns program control back to SC.
8. SC executes JSP pages.
9. JSP pages instantiate Formatting Objects.
10. Formatting Objects retrieve PROs from session variables, and format the results.

11. SC sends response stream back to the User Agent. Response stream contains formatted results and/or IOUs.

Business Objects Layer

Strategy

Strategy 44 includes a number of settings. Strategy can be specified at the session level and then can be selectively overridden by the Portfolios in Portfolio tree. Some parameters such as Benchmark, Numeraire, Market and Analysis Date can also be overridden using Menu Bar as well.

Distributed Analysis

As part of any calculation it is necessary to determine if the operation can be carried out locally or if it must be distributed to a remote machine. This analysis and the subsequent load balancing performed by the infrastructure layer is initiated here.

The criteria are the length of the operation, if all the required information to perform the operation is locally available, or if the cost of getting the information is reasonably low relative to the calculation time, and if the operation requires an asynchronous batch processing to complete.

The analyzer 45 is configured at runtime, or at least at start time. This allows the system to move processing to where it is most effective without having to alter the actual implementation.

Risk Calculator

The risk calculator 46 is exposed through the BDT. It is part of the BDT and represents the workhorse object that is the entry point for all risk computations performed by the application. The client of the BDT operates on the Risk Calculator to set the appropriate state that is represented in their session.

Result Objects

As a result of any calculation, the BDT has a generic collection of results. The results 47 can either live for only the lifetime of the request or it can live in-between the requests. The decision is dependent on the length of time it takes to generate the results, as opposed to the space incurred by the temporary storage of the results.

The benefit of keeping intermediate results between requests is that they can be used for subsequent requests that are only requesting slightly different view of the same data. The persisting of the results also makes it easier to compute the sub-portfolio required when a user navigates on a grouped computed column.

The results can also be represented as an IOU. This indicates that they are going to be generated asynchronously and the user can request them at a later time. In some embodiments, all results manifest themselves this way and the client always checks if the results are available before accessing them and, if they are not, waits for the results. In this model the results are presented as a result handle that must be dereferenced before they can be used. This architecture works well for requests involving synchronous or batch requests.

Other embodiments allow for lazy evaluation of the results. The results then perform on-demand computation or selection to fulfill the client's request. The results can decide the level of granularity to prefetch or precompute, depending on the implementation.

Business Objects

Business objects 48 are also part of the BDT, but only a subset is exposed to the client. They represent all the high level objects, such as the portfolio, position, and asset detail. Some of the interfaces are extensions or implementations of the Analytics Object Library definitions.

The business objects also are the primary paths for data access. These objects represent, extend, or contain data objects that are maintained by the persistence layer. The persistence manager either decides the best place to store the objects or the higher layers tell the persistence manager the best persistence mechanism.

Analytics Layer

The analytics layer houses the computational framework for the system i.e. the analytic engines 13, 14. At present it is assumed to be as stateless as possible with the full context being supplied from the caller. The engines use the Analytic Objects 49 to get the necessary information for the operation that they perform.

It is preferred to provide any of a number of Analytics Engines that are specialized, based on criteria such as Current Analysis, Historical Analysis, Risk, Optimization, and Fixed Income Exposures Calculations. Analytics Engines get the data they need through the interfaces supplied to them by BOL.

Analytics Objects

These are not actually objects, but interfaces used by the analytics layer to get the necessary information for a calculation. The actual objects are implemented in other layers that determine the persistence method and the caching. They form a contract with the other layers that must be fulfilled to perform the operations required correctly.

The risk analytics 50 and the instrument analytics 51 code to the interfaces.

Risk Analytics

The risk analytics 50 contain all risk computations. The risk analytics use exposures from the persistence layer or are calculated by the instrument analytics.

All information is received by the risk analytics through the interfaces defined in the analytics objects. Additional information may be received from the persistence layer directly.

Instrument Analytics

Instrument analytics are the actual mathematical models that perform pricing and exposure computations on specific instruments. These libraries are typically implemented in C++, C, or even Fortran. The system uses JNI to communicate with the external libraries and massage the results back into Java objects.

Most of the data for the analytics are passed from the client. There are some cases where the data may have to come directly from the source, as in MBS pricing with Intex, or from the database. This depends on the requirements of the underlying library and performance considerations.

Infrastructure

Infrastructure 26 refers to a number of services such as Tspaces 17, database caching, Object-Relational mapping, Job scheduling, Tracing, Persistence, Security, and Transaction processing.

Job Management

A job management facility 52 is required to coordinate periodic tasks, as well as long running tasks. The results of such a task must be accessible by the entity that initiated the task at some time in the future. This subsystem must be able to remotely schedule jobs, cancel jobs in progress or waiting to be run, and it must be able to check on job status.

Distributed Processing

Certain tasks require more than a single resource to complete. These tasks are typically large batch processes that require the involvement of multiple machines and processors to complete within the amount of time allotted to their task. The infrastructure must provide distributed services 53 to allow for easy definition of these tasks and a method of distributing the load using available resources. The Load Balancing 54 and Task Coordination 55 modules are involved as well.

Task Coordination

For the tasks that are distributed to more than one process, a mechanism is required to coordinate different sub-tasks that complete the master task. The coordinator aids in resource intensive calculations that require distributed processing. Its role is to manage the resources involved in the subdivided portions of the operation and organize the results from the various sub-components.

Load Balancing

There are three places where load balancing is required: Web Server level, Analytics directly invoked by the user, and Fixed Income Exposures calculations overnight. Web Server load balancing is achieved through hardware. A software load balancing mechanism is implemented under BDT. Exposure calculation for batch processing, as well as for user jobs, is implemented using technologies such as TSpaces.

Distributed Events

Tspaces provides a distributed event mechanism 56 to achieve cache data synchronization when data updates happen and also potentially to handle asynchronous request processing from BDT.

Transaction Management

Transactions are required in many areas of the system. A transaction is defined as a group of operations that either complete as a whole or have no net effect on the system. The most common are database transaction, but transactions can also occur with regard to a distributed set of operations to perform one calculation.

The semantics for the transaction management 57 and rolling back the state to the pre-transaction state are encapsulated in this subsystem. The actual implementation may span multiple subsystems.

Persistence Management

All access to persistent data, whether cached or on database or in a temporary storage such as Tspaces, occurs using this facility. In some embodiments, logging and other similar services use the persistence management subsystem; in others, they go directly to flat files or the database.

Persistence management 58 is the one contact point for all upper layers desiring to make any data persist. As such, it is very important to take into consideration all the different types of persistence and life cycles of the information stored. It must provide an interface that is flexible enough to accommodate all the requirements, as well as provide protection in case it is desired to change the underlying mechanism of persistence later.

Ubiquitous Tracing

It is necessary to be able to turn on Ubiquitous Tracing 59 selectively at different levels of detail for the desired modules to debug Web Applications effectively. There must be a remote API to turn tracing on or off as needed using a management console.

Also to note is the need for assertions that can be selectively removed for release. A preprocessor or other tool should be used to achieve this end.

Data Validation

Data validation 60 is required for proprietary and user supplied data, such as the terms and conditions, market data, and portfolios. It is necessary to put enough checks in place to be able to report meaningful error messages to the user.

Logging/Remote Tracing

Logging capabilities 61 are essential to provide usage analysis and debugging the reported problems. It is necessary to turn on different levels of details as needed from a remote administration console. There should be the capability to search and audit logs from a central site.

Data Access

The data access 25 layer presents a number of different persistent mechanisms that the upper layers can use. There are three different types of persistent storage identified at present. They are as follows:

Long term durable persistence: This is best served by a commercial database that supports transactions and has secure storage and logging.

Shared temporary persistence: To provide services where temporary results are made available for distributed computation this service delivers a shared objects metaphor allowing multiple processes to access the data synchronously. This type of storage is also used for task management and events.

Caching: This provides fast in memory access to data that lives in the same process as the requester. Because the data is in memory it is limited to the available memory of the process.

Using these different methods of storage the requirements of the current system are met and it allows for future real-time functionality.

Database Access

The database 15 is one of a standard relation database, such as an Oracle, Sybase, or MS-SQL Server.

Data Objects

It is necessary to provide Data Objects 62 that hide all JDBC details and give the necessary data by fetching it from the database or cache as appropriate. It is necessary to have aggregate objects that give all related information together.

Distributed Objects

Given that fact that computation results could be passing machine boundaries, it is necessary to design all distributed objects 63 carefully to minimize the number of network roundtrips.

Caching

Given the number of users supported and the amount of data that are going to be common among all users, to achieve high performance caching 28 is required to retrieve such items as Terms and Conditions, market data, model data, and Portfolios. Once the system starts caching the data, it is necessary to take care of updating the cache when the data updates happen. In the preferred embodiment, a TSpaces based pull mechanism is used.

Licensing and Permissions

It is preferred to provide a mechanism (licensing/permissions 64) to restrict access to certain vendor data based on the Licensing (subscription) of the user. For example, Intex CMO data access is given only if the user has paid for an upfront subscription for accessing that data. The invention also allows Organizations and users to associate permissions with various items, such as Portfolios, Portfolio trees, and Strategies.

Screening Tools

It is necessary to support screening 65 of assets based on a number of criteria including descriptive and pre-computed values. The preferred embodiment uses an underlying database engine to do this.

Billing

A billing system 43 is invoked by the HAL at the end of output response generation. An inquiry is also made at the beginning of any session for quota overrun. The billing system must get information, for example, in the following areas: time of modification of the portfolio, list of attributes in the report, user, and session. The billing system is responsible for combining multiple log entries that have repeated billable levels for one session into a single log item.

The billing subsystem is isolated as much as possible in the system so that changes in the underlying charging event structure do not affect other parts of the application. It is dependent on the session to identify the user, the client and the session ID and it may need some persistence services to obtain client charge levels. It is a matter of choice if the billing level information is kept together with the rest of the data or in a separate data store.

At this time, the billing system is asynchronous with respect to the request. The system logs that a billing event occurred and the billing system aggregates the log events in the background.

Quota checking and enforcement is also located in this area. It shares the asynchronous nature and performs the quota checks in the background. Because of the overhead of multiple requests arriving from multiple users for a single client and the transaction nature of the billing system, it is required to insure correctness for each event and the resulting quota adjustment.

Enforcement is performed when a user limit is reached. This enforcement refuses a user's request to log into the system. The billing system does not enforce the log on restriction, but informs the HAL that the quota has been reached and that subsequent logons are not allowed. This information may be either pushed or pulled.

The billing subsystem may reside on a separate server or groups of servers depending on the overhead and the need not to impact overall response times.

Billing Logging

All Billing events go to a persistent store (billing storage 66), preferably a separate database and server of its own so as not to affect the performance of the application.

Activity Analysis

In the preferred embodiment, it is useful to create names for each canonical message trace, as shorthand to use in design sessions. The nomenclature for the message flow is derived from the logical architecture and is summarized below. For a detailed diagram, refer to the section herein entitled Logical Architecture Tier 1: Browser User Agent
   HTTP-HTML/XML
   Applets
   Data Upload/Download Tier 2: HTTP Application Layer
   Web server
   Servlet Container
   URL Request Processor
   Page Template Library
   Event Dispatcher
   Event Handler
   Formatting Objects
   JSP
   Session
   Feed/Update Tier 3: Business Objects
   BDT API
   Business Objects
   Distributed Analysis
   Result Objects
   Strategy
   Risk Calculator Tier 4: Application Layer
   Analytics Objects
   Risk Analytics
   Instrument Analytics Tier 5: Infrastructure
   Job Management
   Distributed Services
   Task Coordination
   Distributed Events
   Load Balancing
   Transaction Management
   Persistence Management
   Ubiquitous Tracing
   Data Validation Tier 6. Data Access
   Database
   Data Objects
   Distributed Objects
   Caching
   Licensing and Permissions
   Screening There are some items in the Billing category that become their own subsystem. They have been mapped to the tiers as follows:

Tier 3: Business Objects
   Billing API

Tier 5: Infrastructure
   Billing Logging

Tier 6: Data Access
   Billing Storage
   Logon

Table "A" below shows a logon sequence according to the invention. In this table and all other tables below, the numerals, e.g. 2.1, refer to tiered elements shown in the logical diagram of FIG. 2.

TABLE A

Logon

| UC Step# | Sub-step# | Message Flow | Event Processing/ Action Description |
|---|---|---|---|
| 1. Logon | 1.1 | 1.1 → 2.1 | 2.1 receives http request for logon with user id/pswd |
| | 1.2 | 2.1 → 2.2 → 5.7 → 6.2 → 6.1 → . . . 2.2 | 2.2 establishes http session using persistence manager to get session data. |
| | 1.3 | 2.2 → 2.3 → 2.4 → 5.7 → . . . 2.2 | 2.4 retrieves user's home-page, failure page |
| | 1.4 | 2.3 → 2.5 → 2.6 | Logon (EH1), page fetch (EH2) event handlers dispatched |
| | 1.5 | 2.6 → 6.5 | EH1 authenticates login/pwd |
| | 1.6 | 6.6 → 2.6 | EH1 creates result object ("Yes") |

TABLE A-continued

Logon

| UC Step# | Sub-step# | Message Flow | Event Processing/ Action Description |
|---|---|---|---|
| | 1.7 | 2.5 → 2.6 | EH2 dispatched |
| | 1.8 | 2.6 → 3.1 | EH2 creates BDT session, initializes w/authentication info from HTTP session. |
| | 1.9 | 2.6 → 3.1 → 5.7 → 2.6 | 2.6 retrieves user-specific info from 3.1, populates result object |
| | 1.10 | 2.6 → 2.2 → 2.8 | Build JSP page |
| | 1.11 | 2.8 → 2.7 → 2.8 | Format page |
| | 1.12 | 2.8 → 1.1 | Send to user agent |

Table "B" below shows a submit calculation request for risk summary according to the invention.

TABLE B

Submit Calculation Request For Risk Summary

| UC Step# | Sub-step# | Message Flow | Event Processing/ Action Description |
|---|---|---|---|
| 2. Get Portfolio Risk Summary | 2.1 | 1.1 → 2.1 → 2.2 | T1 User Agent (UA) request to Servlet Container (SC) |
| | 2.2 | 2.2 → 2.3 → 2.4 → 5.7 → 2.4 → 2.3 → 2.5 | T2 Servlet Container asks URL Request Processor to parse URI into sequence of Event/Handler pairs (can reuse handlers for multiple events), asks Template Factory for jsp page template, TF retrieves template from persistent storage. Side effect: URP sets SC variable(s) with override values. (Q: can template be user-specific?) |
| | 2.3 | 2.5 → 3.1 → 5.7 → (6.1/6.4) . . . → 2.5 | T2 Event Dispatcher sets up events and sequences them: Setup strategy overrides (benchmark, numeraire, etc.) Load holdings Compute TR |
| | 2.4 | 2.5 | T2 Event Dispatcher receives events |
| | 2.5.1 | 2.5 → 2.9 | T2 Setup session (Note: session initialization may use lazy, piecemeal loading, thus steps 2.5.1.1-2.7.3.1 are just example fetch sequences to illustrate general "Get Session State (GSS)" initialization pattern, and to validate adequacy of data/message flow in architecture) |
| | 2.5.1.1 | 2.9 → 5.7 | T5 Retrieve session (defaults) from Persistence Manager (PM decides between cache, or disk retrieval) |
| | 2.5.1.1.1 | 5.7 → 6.2 → (6.1/6.4) → 6.2 → 5.7 → 2.9 → 2.5 | T6 Get session data (assume disk retrieval, since this is first reference to session). Return usable session to T2 |
| | 2.6 | 2.5 → (2.6) | T2 ED creates Event Handler (EH) objects |
| | 2.7 | 2.5 → 2.6 | T2 ED dispatches Event A, setup strategy |
| | 2.7.1 | 2.6 → 2.9 | T2 EH-A gets strategy object from session state |
| | 2.7.1.1 | 2.9 → 3.1 | T3 assembles strategy data |
| | 2.7.1.1.1 | 3.1 → 3.2 → 5.7 → 6.2 → (6.1/6.4) → . . . 3.1 → 2.6 | T5 fetching of individual strategy sub-parts, check permissions if applicable. |
| | 2.7.2 | 2.6 → 2.2 → 2.6 | T2 get session overrides from SC (values set by URP in 2.2) |
| | 2.7.3 | 2.6 → 2.9 | T2 Set strategy override property-bag in session |
| | 2.7.3.1 | 2.9 → (3.1/3.2) → 2.9 → 2.6 | T3 (Maybe) examine override properties for some optimization or business reason that is now nebulous . . . |
| | 2.8 | 2.6 → 2.9 | T2 Dispatch Event B: Load Holdings |
| | 2.8.1 | 2.9 → 3.1 | T2 Ask session for holdings by portfolio name. If holdings not cached (pf = = null), load, else –>2.9 |
| | 2.8.1.1 | 3.1 → 3.2 → 5.7 | T3 call getHoldings(name, strategy, date, etc) API |
| | 2.8.1.1.1 | 5.7 → 6.5 → 5.7 → 3.2 → 3.1 | T5 permission check: ?can user access this portfolio? Is user licensed for these instruments? If not, throw exception now. |

TABLE B-continued

Submit Calculation Request For Risk Summary

| UC Step# | Sub-step# | Message Flow | Event Processing/Action Description |
|---|---|---|---|
| | 2.9 | 2.6 | T2 Dispatch event C - ComputeTR |
| | 2.9.1 | 2.6 → 2.9 | T2 Get riskCalculator "rc" from Session |
| | 2.9.1.1 | 2.9 → 3.1 → 3.6 → . . . 2.6 | T3 return Factory.GetRiskCalculator( ) to T2 |
| | 2.9.2 | 2.6 → 5.7 | T2 Get columns for Risk Summary report (GSS pattern) |
| | 2.9.2.1 | 5.7 → 6.2 → . . . 2.6 | T5 Retrieve columns from persistence |
| | 2.9.3 | 2.6 → 3.1 → 3.6 | T2 Invoke rc.computeTR(pf, strategy, etc.) |
| | 2.9.3.1 | 3.6 | T3 delta-check input (hash) against cache |
| | 2.9.3.2 | 3.6 → 3.3 → 3.6 | T3 analyze job size, decide on local, remote (we'll assume local and save load balancing and cache-checking details for design) |
| | 2.9.3.3 | 3.6 → 5.7 | T3 get exposures: |
| | 2.9.3.3.1 | 5.7 → 6.2 → (6.1/6.4) → 5.7 → 3.6 | T5 retrieve any pre-computed exposures |
| | 2.9.3.3.2 | 3.6 → 4.1 | T4 calculate remaining exposures: |
| | 2.9.3.3.2.1 | 4.1 → 4.2 → 5.7 → . . . 4.1 | T4 retrieve necessary T&C, market data, etc |
| | 2.9.3.4 | 4.1 → 3.6 | T4 compute rolled-up risk results, |
| | 2.9.3.5 | 3.6 → 3.4 → 3.6 → 3.1 | T3 populate result object (RO) |
| | 2.9.4 | 3.1 → 2.9 → 2.6 → 2.2 | T2 get result object, set handle in SC variable |
| | 2.10 | 2.2 → 2.8 | T2 SC executes JSP |
| | 2.10.1 | 2.8 → 2.7 → 3.4 → . . . → 2.8 | T2 JSP code feeds RO data to Formatting Objects (FO) |
| | 2.10.2 | 2.8 → 2.1 | T2 SC spits XML/HTML response to Web Server |
| | 2.10.3 | 2.1 → Async(3.9) | T2 can initiate async billing computation |
| | 2.11 | 2.1 → 1.1 | T1 UA renders data (The End) |

Standard Request Handling Pattern

Table "C" below shows the standard message flow for most requests through the system.

TABLE C

Standard Message Flow

| UC Step# | Sub-step# | Message Flow | Event Processing/Action Description |
|---|---|---|---|
| 1 | | 1.1 → 2.1 | User interacts with browser and request is sent to Web Server |
| 2 | | 2.1 → 2.2 | HTTP request is sent to the servlet container where it is interpreted. |
| 3 | | 2.2 → 2.3 | URL request processor receives request (URL). |
| 4 | | 2.3 → 2.4 | URL is processed by retrieving the template for this URL from the template factory. |
| 5 | | 2.4 → 2.3 | Template is passed back to URL processor. The template consists of a page template and a set of events. |
| 6 | | 2.3 → 2.5 → (2.6) → 2.5 | Template is sent to event dispatcher. The event dispatcher will create the events from a factory. |
| | 6.1 | 2.5 → 5.7 | Event dispatcher retrieves the session object from the persistence manager. |
| | 6.1.1 | 5.7 → 6.2 → (6.1/6.3/6.4) → . . . 2.5 | Persistence Manager retrieves the persistent session from data access. |
| 7 | | 2.5 → 2.6 | Each event will be invoked with the current session. |
| | 7.1 | 2.6 → 3.1 → 2.6 | If the method involves a calculation, a risk calculator will be created via the BDT. |
| | 7.2 | 2.6 → 3.1 | The operation or the calculation will utilize the BDT to perform the action. |
| | 7.2.1 | 3.1 → 3.3 → 3.1 | The BDT will determine if the operation can be performed locally or should be distributed. |
| | 7.3 | 3.1 → 2.6 | Results will be returned. |
| 8 | | 2.6 → 2.5 | The event will produce a set of objects which will be associated with a name. These will be kept in the session. |
| 9 | | | Repeat steps 7 and 8 for each event |
| 10 | | 2.5 → 2.3 → 2.2 | After all the events have been processed the page template is handed back to the servlet container |
| 11 | | 2.2 → 2.8 | The servlet container evaluates the template and executes all the JSP sections. |
| 12 | | 2.8 → 2.7 → 3.4 → 2.7 → 2.8 | JSP calls the formatting objects which in turn get the results from the result objects and format them. |

TABLE C-continued

Standard Message Flow

| UC Step# | Sub-step# | Message Flow | Event Processing/ Action Description |
|---|---|---|---|
| 13 | | 2.8 → 2.2 → 2.1 | The completed page is given back to the Web server |
| 14 | | 2.1 → 1.1 | The response is received by the user. |

Table "D" below shows a sequence for saving a portfolio at logoff according to the invention.

TABLE D

Sequence for Saving a Portfolio at Logoff

| UC Step# | Sub-step# | Message Flow | Event Processing/ Action Description |
|---|---|---|---|
| 1 | | 1.1 → 2.1 | User selects logoff |
| 2 | | 2.1 → 2.2 → 2.3 → 2.4 → 2.3 → 2.5 | Servlet container receives the request and passes it to the URL request processor. The request processor retrieves the template for logging off. The template is then sent to the event dispatcher. The template contains two parts. Close portfolio Logoff |
| 3 | | 2.5 → 2.6 | The close portfolio event is dispatched with the session. |
| 4 | | 2.6 → (... 1.1 ...) | The event goes through the states described above, possibly requiring interaction with the client. These operations will be fleshed out as we design the entire logoff procedure. |
| 5 | | 2.6 → 3.1 | Save portfolio is selected with a name. |
| 6 | | 3.1 → 5.7 → 3.1 → 2.6 → 2.5 | Portfolio is saved in database. |
| 7 | | 2.5 → 2.6 | Logoff event is processed. |
| 8 | | 2.6 | Session is unreferred and state is cleaned up. |
| 9 | | 2.6 → 2.5 → 2.2 → 2.1 → 1.1 | User has logged off and goodbye screen template has been presented to usr. |

Table "E" shows a data update from feed according to the invention.

TABLE E

Data Update From Feed

| UC Step# | Sub-step# | Message Flow | Event Processing/ Action Description |
|---|---|---|---|
| 1 | | 2.10 → 5.9 | Feeder gets data from external data source. The data is then feed into the validation package. |
| 2 | | 5.9 | Validation rules check for correctness of data and conditions |
| | 2.1 | 5.9 → 2.10 | Schema validation. The basic structure and syntactic correctness is checked. |
| 3 | | 2.10 → 5.7 → 6.2 → (6.1/6.4) → 6.2 → 5.7 | Data is placed into database. The persistence layer will validate that correctness of the data with regards to the database. This will entail validating uniqueness and relations. |
| 4 | | 2.10 → 5.7 | Transaction is committed. |

TABLE E-continued

Data Update From Feed

| UC Step# | Sub-step# | Message Flow | Event Processing/ Action Description |
|---|---|---|---|
| 5 | | 2.10 → 3.1 → 5.2 → 3.1 | An event will be generated indicating that something has changed. Possibly containing a description of the type of data. (T&C, Price, Rates, Exposures, Covariance, Benchmark, ....). The event will be handled by the BDT. |
| 6 | | Async(3.1 → 5.1 → 3.1) | Event is received by the BDT and actions are performed. |
| 7 | 5.1 | 3.1 → 5.7 | Data in analytics may have to be refreshed. |
| 8 | 5.1 | 3.1 → 5.1 | If any jobs need to be scheduled as a result of this event, job management will need to create the tasks at this time. The jobs that have been identified are as follows: FI Exposures Composite processing Benchmark processing |
| 9 | | 3.1 → 2.10 | Processing is complete |

Front End

Figure 4:
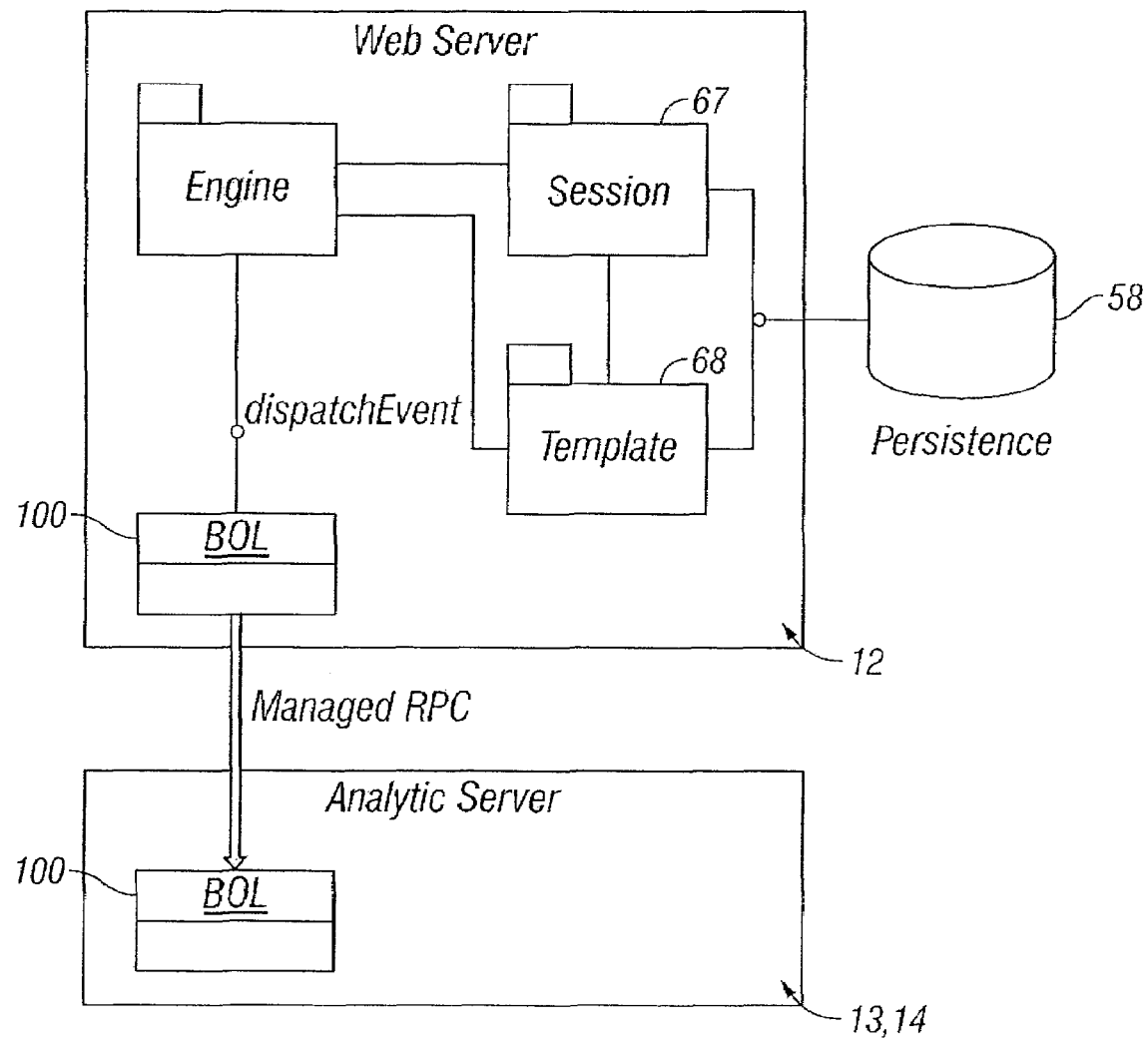
FIG. 4 is a block schematic diagram showing a front end for a system for portfolio management and risk-analysis according to the invention.

The following discussion describes the design of the system Front End, i.e. the User Agent Layer and the HTTP Application Layer (see, also, FIG. 4). For an overview of the architecture, and a description of how the front-end fits in the application process flow, refer to the High Level Architecture description herein.

The Front End is mainly responsible for:

Interpreting HTTP requests and invoking business objects and infrastructure services to process the requests;

Transforming results into various presentation formats and delivering HTTP responses to user agents;

Providing interactivity while encapsulating HTTP protocol and user agent details; and Interfacing with internal or external security, logging and administration mechanisms.

The Front End handles the application workflow in an extensible, data-driven manner; processes HTTP requests in a non-blocking, asynchronous event-driven manner; supports the scalability, fault-tolerance, and high-availability expected from a Web application service; and replaces individual components and modules without impacting system architecture.

The Front End consists of two main components (discussed in greater detail below):

1. Framework. The Framework component addresses the structure, composition, layout, navigation, and presentation aspects of a Web application.

2. Application. The Application component implements system functional requirements.

Front End Architecture

The Front End is a JAVA Web application framework. It is designed to handle HTTP requests in a non-blocking, asynchronous event-driven manner. It can gracefully handle the large variation in processing latency, and insulate the rest of application layers from presentation and HTTP protocol details.

The Front End is built on top of a template mechanism 68 and a set of reusable UI modules and handles application workflow in a data-driven manner. It is designed to support evolution in application functionality while minimizing impact to system architecture. One of the design guidelines for Front End is to leverage the application services provided by the underlying platform as much as possible. The focus of the design is to introduce a set of necessary abstractions that compensate the weaknesses in existing technologies. It relies on the Web server 12 and servlet container (see FIG. 2) to handle most of HTTP protocol and communication details. The template mechanism incorporates JSP and the XML-based design patterns popularized by the Apache community. The protocol bindings have closely followed W3C standards and recommendations.

At the heart of the Front End are the event mechanism and the template mechanism. The event mechanism handles workflow command generation, command dispatch, and result rendezvous. The template mechanism describes the command definition, workflow modeling and result transformation. Working together with an array of reusable UI modules, the event and template mechanism significantly improve the speed of new development and reduce the cost of maintenance.

For fault-tolerance, the Front End incorporates a retry mechanism for event dispatching. As long as the session states are distributed, the worst case after a Web server failure is to force the user to resubmit last request, which is similar to what happens when the system is under extreme load.

Components

As discussed above, the Front End consists of two components:

The Framework component, a.k.a. HAL, addresses the structure, composition, layout, navigation, and presentation aspects of a Web application.

The Application component is collection of application modules built on top of the Framework, the BOL 100, and infrastructure services that implement the functional requirements.

Figure 5:
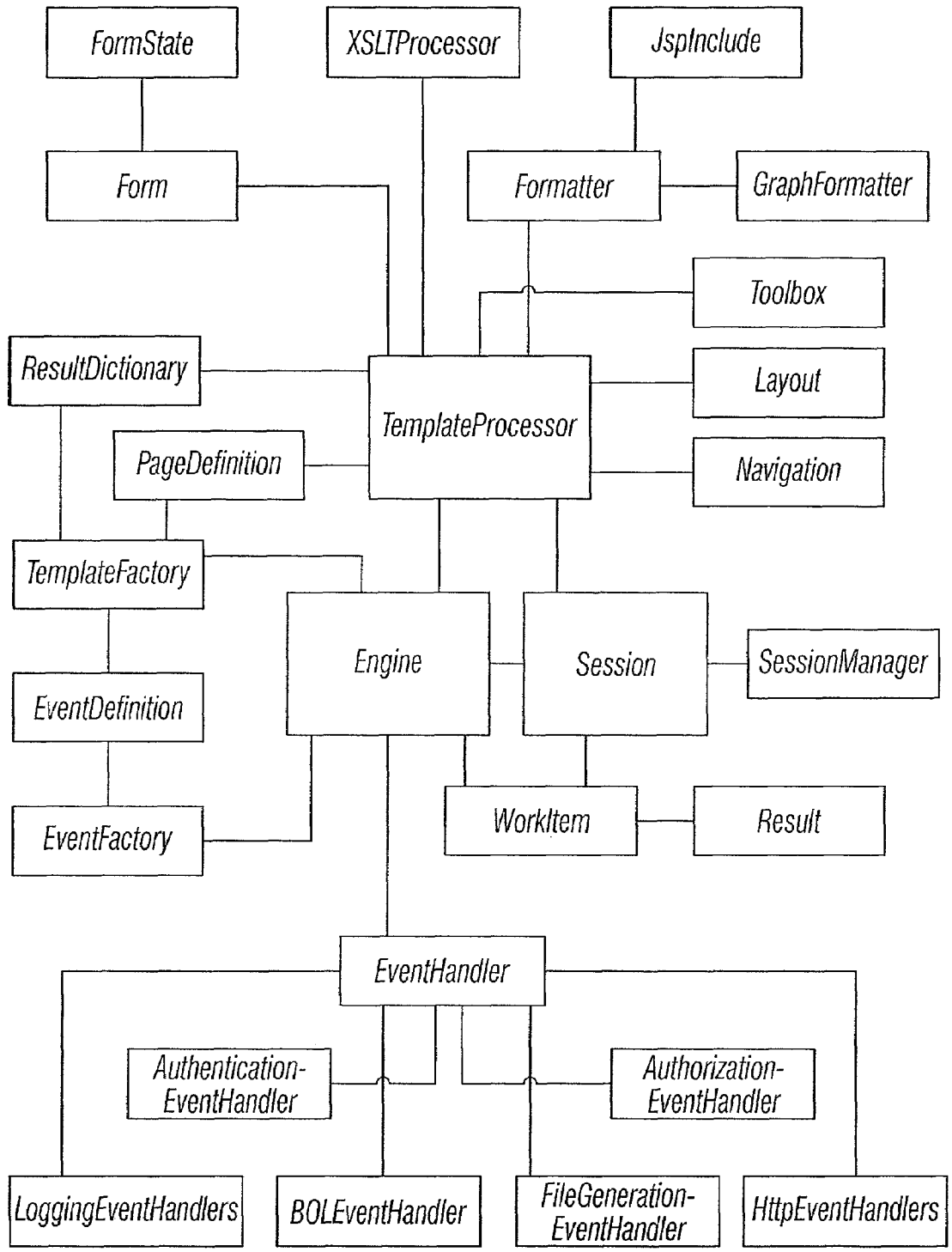
FIG. 5 is a block schematic diagram showing front end interfaces for a system for portfolio management and risk-analysis according to the invention.

FIG. 5 is a block schematic diagram that shows the major interfaces in the Front End.

Framework

The Framework component is the foundation of the Front End. Physically, the Framework component resides on the Web Server and in the same process space with the Servlet Engine. It interacts with the BOL and infrastructure services through a few well-defined interfaces. Communication is performed by using pass-by-value semantics. The design strives to decouple the front-end from the underlying application layers, allowing them to be developed independently, and be separated across physically boundaries when necessary.

Session

Session states in the front-end includes three types of information:

Object graphs of WorkItem, results, events, etc.;

Object graphs of form states, uncommitted data entries, etc; and

Miscellaneous session attributes which includes session id, versioning information, timers, etc.

Objects that can be readily refreshed from the persistent store such as template definitions and toolboxes are not part of the session. They reside in a weakly referenced memory cached.

Session uses a versioning scheme to handle load balancing. Specifically, the session object and the root nodes of each object graph carry a version flag, which is incremented after an update on any child item. SessionManager is responsible for committing the version information and delta state changes to a persistence store.

When a request reaches a Web server, the SessionManager first compares the session object's version to what is in the persistent store. A mismatch triggers a traversal of the object graphs, which ultimately results in stale or missing object graphs be snapped into memory from the persistent store. The timing and granularity details of session migration depend on the persistence mechanism.

SessionManager can destroy a session or deactivate an inactive session. When a session is destroyed, a full traversal of the object graphs is performed and explicit calls made to free resources. When a session is deactivated, all session states are persisted before resources are freed.

In general, a session's lifetime is >=HTTP session lifetime, which is >=SSL session lifetime. SessionManager maintains a reaper thread to garbage-collect expired sessions. Session can also be explicitly invalidated through administrative actions, e.g., locking out a user's account.

Request

General Processing Sequence

Figure 6A:
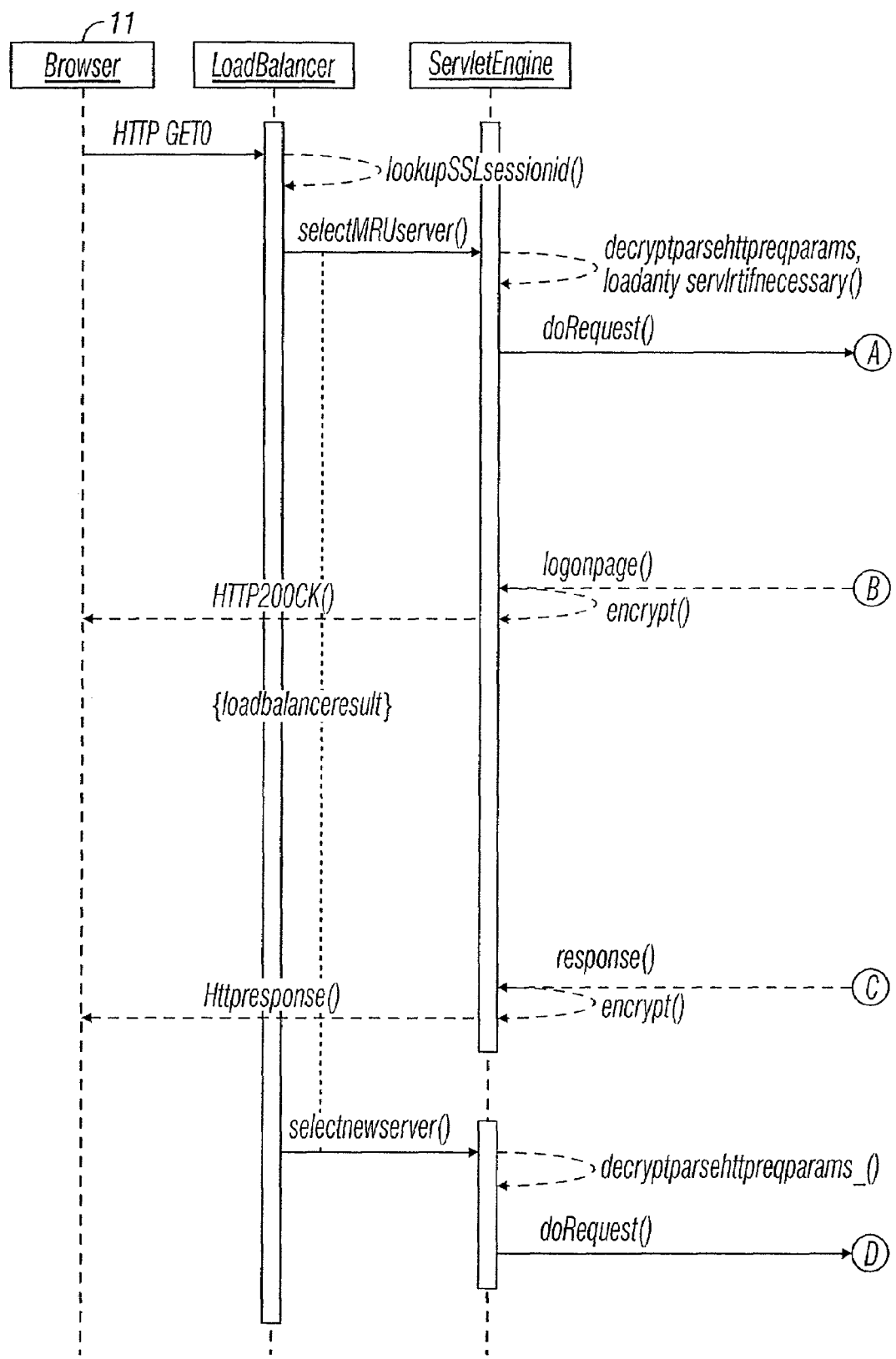
FIG. 6 is a flow diagram showing session validation for an HTTP request in a system for portfolio management and risk-analysis according to the invention.
Figure 6B:
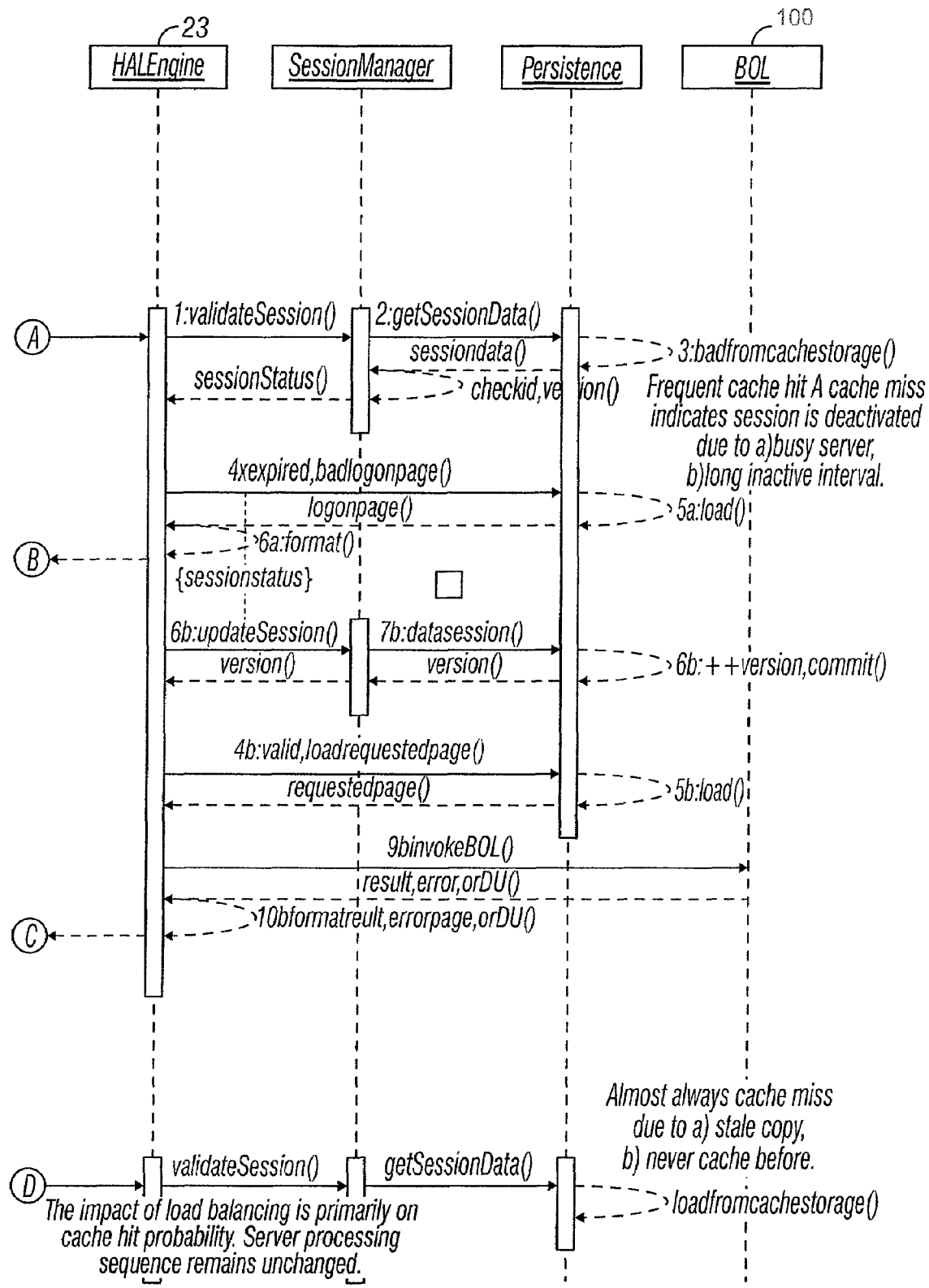

In general, the following steps are performed for each unique request (see FIG. 6):

1. session is validated and brought up-to-date;
2. request URI is parsed and user authorization is verified;
3. a workItem is created for the request;
4. a template page associated with the request get loaded from either cache or persistent storage;
5. a set of event are constructed according to event definition and the instructions in the template page definition;
6. event instances are populated with http request parameter values;
7. events are dispatched, which ultimately result in the invocation of corresponding BOL API functions;
8. if the events are completed quickly enough, result objects are collected and transformed into various presentation formats, e.g. HTML pages, and delivered to the client. Otherwise, an IOU is delivered instead;
9. for browser client, the IOU response contains mechanism to give user visual feedback of the work item status;
10. IOU is automatically redeemed at later time when the results are ready;
11. derivative events, such as billing and activity logging, are dispatched asynchronously at the appropriate time.

Request Lifetime

The lifetime of a request is embodied in the underlying WorkItem. After a WorkItem is created for a request, its lifetime may last beyond immediate HTTP request/response. It persists in session until the earliest of:

user explicitly cancels a request, e.g. by clicking the cancel button, user implicitly cancels a request by submitting a new request, user redeems the results, session times out, or become invalid for other reasons, before the request is complete.

Calling the WorkItem.destroy( ) method causes existing results get discarded, and cancel( ) get called on the event handlers for in-progress events. Regardless the cancellation mechanism works or not, the effect is invisible to the user because the WorkItem being cancelled is no longer the current WorkItem of the session.

Result Identification

For normal processing flow:
a WorkItem is created for each unique URI request,
each URI request is mapped to a template page,
each template page contains one or more widgets,
each widgets contains one or more event reference,
each event is mapped to one API call,
each API call results in one result object, Normally, it is not necessary to perform a full traversal of the object hierarchy to locate the correct result object. Certain programming convenience is provided. For example, the JspInclude formatter sets the relevant result object as a special request attribute before invoking a JSP page. The JSP page can then query the request attribute to retrieve the result object.

Event

EventBundle

BOL events are dispatched in EventBundles. The motivation is to enforce Event ordering and to facilitate stickiness. The ordering information is explicitly listed in template definition.

BOL results are returned in ResultBundle, which consists of results for all events in an EventBundle. It is BOL's responsibility to manage the persistence of partially completed ResultBundles. Results from a BOL event are either the actual result or a reference to the physical location of the result.

Both BOL event and result use SOAP Encoding as wire protocol.

Dispatch BOL Events

Figure 7A:
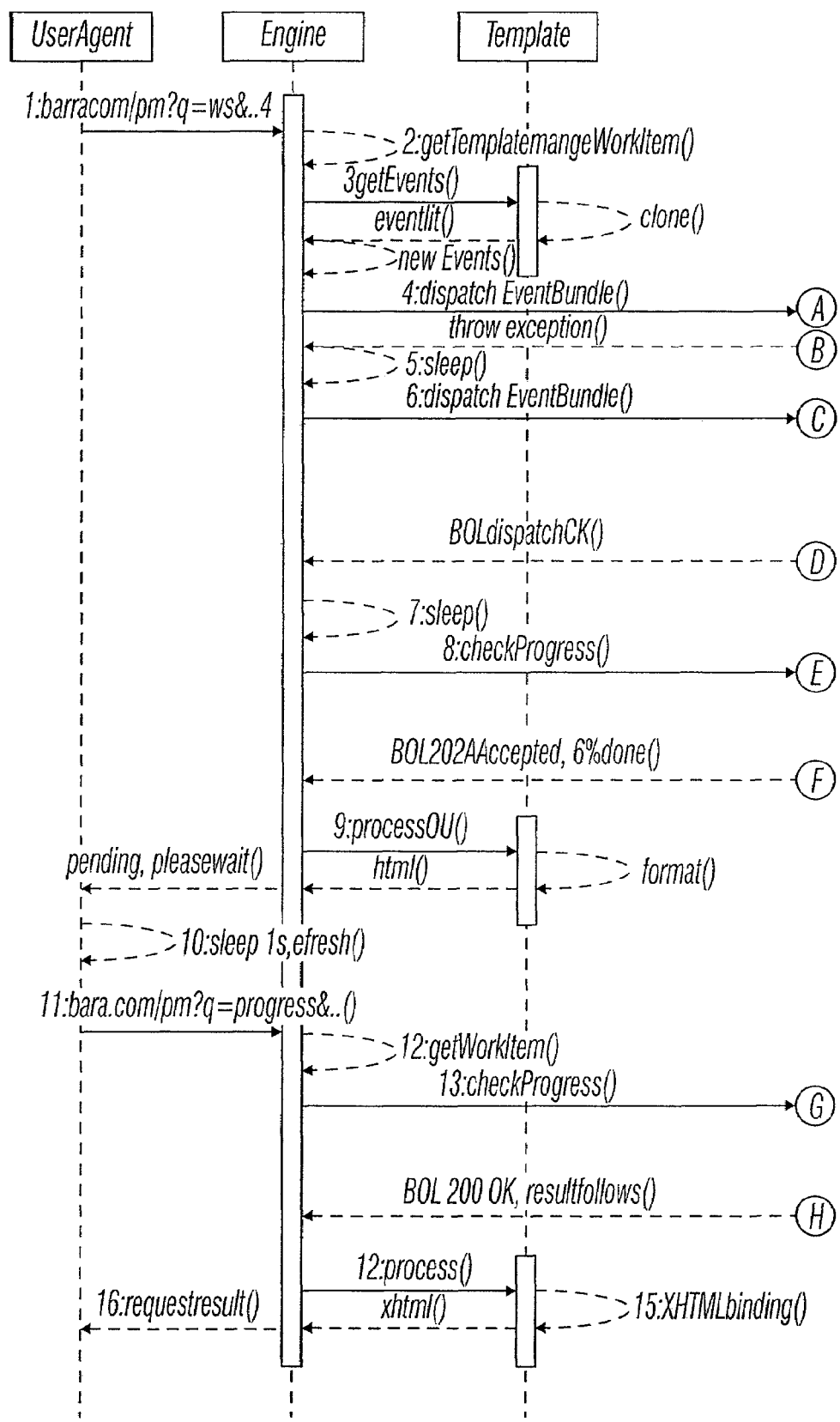
FIG. 7 is a flow diagram showing BOL invocation with an EventBundle module in a system for portfolio management and risk-analysis according to the invention.
Figure 7B:
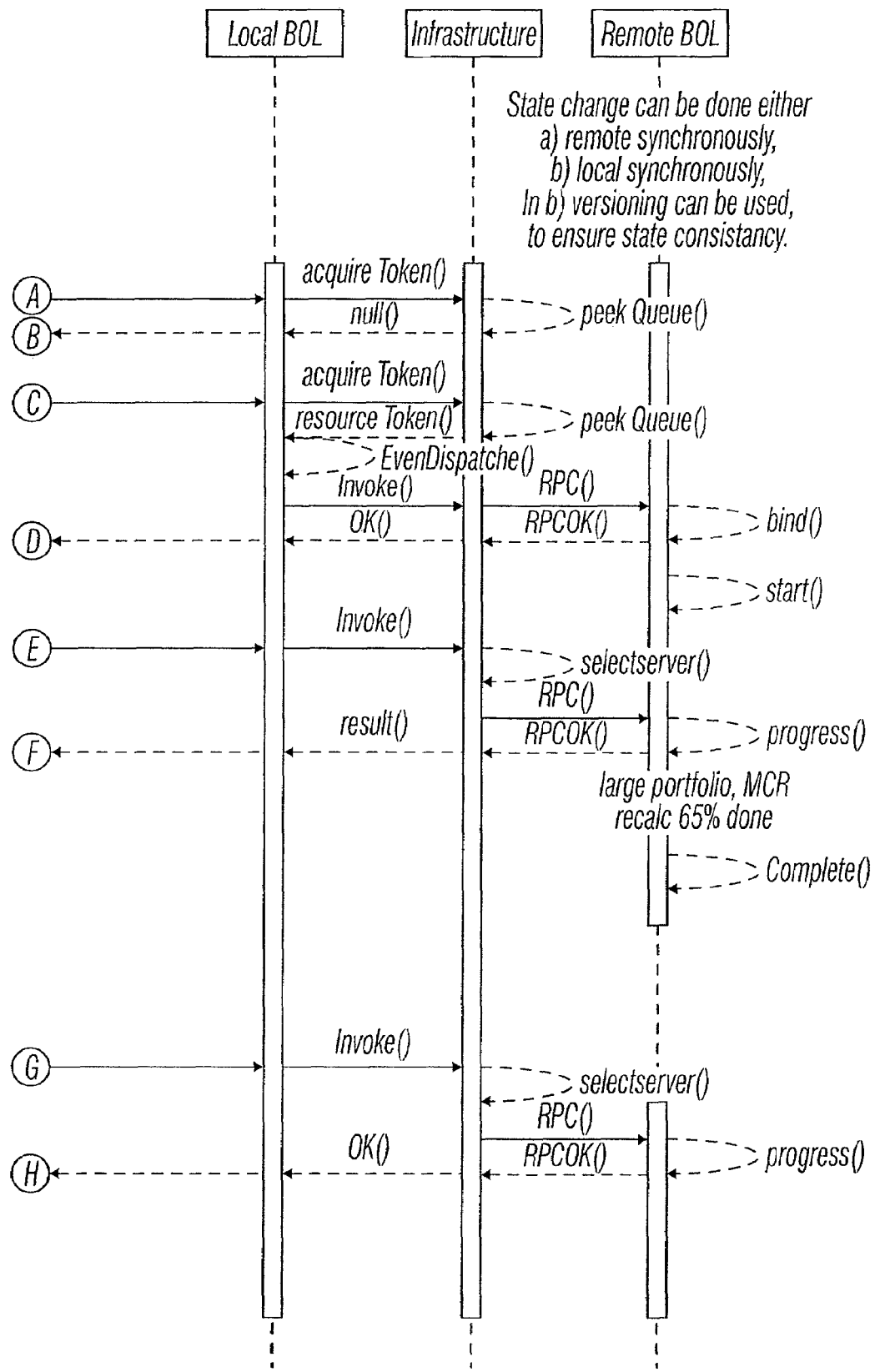

For general event processing sequence, refer to FIG. 7.

As an optimization, during the initial dispatch of an EventBundle, hal.eho.BOLEventHandlers may:
call BOL.EventHandler.dispatchEvent(foo);
call Thread.sleep(bar);
call BOL.EventHandler.checkProgress(foo).

The third step is speculative attempt to recover the result objects in case the processing has completed. This potentially saves a full HTTP round-trip involved in the redemption of the IOU.

Checking Progress

Progress monitoring is done on an EventBundle basis. Checking progress is initiated by either user agent or by HAL.

The WorkItem object estimates the overall progress of a request with a simple weighting scheme. For example, if a request resolves into two event bundles that are 100% and 50% completed respectively, WorkItem regards the request as at least 50% complete.

Retry

To retry a request after a server fault, WorkItem keeps a private copy of events created by the request. After a failure occurs, existing results are kept. The unlucky EventBundle will be retried. It is up to BOL to guarantee the retried operations are idempotent.

Exception

Classification of Exceptional Conditions

There are many adjectives to describe exceptional conditions, for example:
System-level vs. Application-level
Catastrophic vs. Recoverable
Terminal vs. Resumable
Unexpected vs. Expected In general, the former type exception implies that the system can not be easily restored to a consistent state, while the later can.

It is easier to catch and handle the former type of exception because such an exception can be treated as core dump. Because recovering from inconsistent state is a problem, one would think twice before catching such an exception.

Exception Mechanism in Programming Languages

Java and C++ both provide language facility for exception handling. The basic attitude is to treat error as terminal. Error is so critical that there is no way to salvage the situation and get back to where the error occurred. Execution is only continued in the immediately enclosing scope of exception handler.

The alternative attitude is hoping an immediate handler can correct fault condition, thus execution can continue from the point where the fault is detected. It is a powerful concept that can eliminate the explicit checks of return codes for recoverable failures.

Although resumption sounds attractive at first, historically developers have abandoned resumptive exception handling and used the non-resumable model. The reason is that error conditions are so context sensitive that you have to code the handler to know the exact throw location. That makes exception handling messy and tedious.

There is a third attitude embodied in COM, where you are on your own as far as error handling is concerned. A single unchecked HRESULT is capable of bringing down the system in spectacular failure. And there are hundreds or thousands of them to check in a non-trivial application.

The Need for Additional Exception Handling Facility

One of design goals for the Front End is to provide a robust exception-handling framework. Although powerful, Java's exception mechanism does not offer enough flexibility and facility to deal with the complexity of error handling. The complexity manifest in two areas: workflow and presentation. For example:

A single BDT API invocation may have multiple return status and each required to be handled differently under different context. For example, committing change to a portfolio may return:
success,
success with warning, e.g., portfolio still opened by another user,
insufficient privilege,
portfolio does not exist,
name conflict,
data validation failure,
transaction time out,
unspecified system failures, etc, How to deal with the return status is different depending on whether the API is invoked in an interactive application or a batch job. It may also be different from version to version.

A single error condition may have multiple views. For example, views of a data validation failure may include:
a prompt to the end-user to correct the error along with a descriptive message,
a complete stack trace log to facilitate debugging, an entry in the system log,
an automatically generated administrative alert through email, etc.

The sequence and the actual presentation of these views would definitely change over time. More views can also be added.

Thus, a hardwired exception handling mechanism, such as directly catching exceptions thrown by the Business Object Layer, would result in unwieldy and difficult to maintain code.

Template Mechanism for Exception Handling

The Front End uses the template mechanism for handling exceptional conditions. Success state is just one the possible states.

Base on recoverability, the Front End distinguishes two basic categories of exceptions.

Error

Errors are considered fatal and non-resumable. Errors include both critical system failures and unanticipated application failures.

Default action is to notify user, write system log, and abort current request.

Exception

Exceptions are anticipated and possibly resumable. Exceptional conditions and handlers are listed in templates. Template provides both the context and presentation information for exception handling.

Default action is to invoke the relevant handlers defined in the template.

Modules

Engine

Servlet Entry Point

Overview

All incoming URL requests are mapped to a single servlet. The servlet entry point is responsible for, Validating requested application session. Depending on the validation results, the request is forwarded to the URL Request Processor, or the user is prompted for authentication.

Passing request onto request processing engine.

Performing housekeeping functions, e.g. browser sniffing.

Criteria

The J2EE platform defines two important containers, the servlet container and the EJB container. HAL relies on the servlet container to handle most of the HTTP protocol and communication details. HAL, and the rest of the architecture, does not rely on any service provided by the EJB container, that should yield substantial savings in deployment and production cost. URL Request Processor URL Request Processor is responsible for processing incoming requests. It distinguishes two types of requests, Requests that can be handled without invoking BOL.

Examples include status check of previously submitted long-running requests, cancellation of an in-progress request, submit to a multi-page form, or results delivery confirmations. For performance purpose, processing this type of request is short-circuited, i.e. not routed through the infrastructure's event dispatching mechanism.

Requests that need to be handled by invoking BOL.

Examples include authentication, risk analysis and reporting, import/export, administration request, etc. This type of request is routed through BOL event dispatching mechanism.

Engine

Engine is the controller for processing requests. Lifetime of the Engine object coincides with the entry servlet.

```
public interface Engine
    {
        public void init( );
        public synchronized void shutdown( );
        public synchronized void suspend( );
        public synchronized void resume( );
    public void process(HttpServletRequest request,
    HttpServletResponse response);
        public String parse(String uri);
        ...
    }
```

WorkItem

WorkItem links together the request and the result. It provides the context for the logical thread of execution for handling a request.

Note that user may click the back, forward, stop buttons on the browser, or navigate to another site before the response is delivered. The worst effect is equivalent to user closes the browser window.

```
public interface WorkItem extends java.io.Serializable
    {
        public GUID getId( );
        public synchronized long getVersion( );
        public synchronized void setVersion(long);
        public synchronized void destory( );
        public synchronized void deactivate( );
        public double getProgress( ); // in percentage, 75% return 75.0
    public void addEvent(Event foo);
    public Vector getEvents( );
    public Vector getRemainingEvents(GUID eventId);
    public void addEventBundle(EventBundle foo);
    public Vector getEventBundles( );
    public Vector getRemainingEventBundless(GUID bundleId);
    public void setResult (GUID eventId, ResultObject foo);
    public Result getResult(GUID eventId);
    public Hashmap getResults( );
    public void setResultBundle (GUID bundleId, ResultObject foo);
    public Result getResult(GUID event_id);
    public Hashmap getResults( );
    public String getTemplatePage( );
    public void setTemplatePage(String uri);
    public void setRetryTotal(int);
        public void setRetryInterval(int); //in ms
        ...
    }
```

WorkSet

WorkSet is a simple collection interface for WorkItems. Lifetime of the WorkSet is application session. The current requirement only allows one active WorkItems per session.

```
public interface WorkSet extends java.io.Serializable
    {
        public int size( );
        public void add(WorkItem foo);
        public WorkItem get(GUID foo);
    public Iterator iterator( );
    //calling setCurrentWorkItem displaces existing current WorkItem
    public void setCurrentWorkItem(WorkItem foo);
        public WorkItem getCurrentWorkItem( );
    }
```

Result

Result encapsulates result from a business API invocation. The wire format of a BOL result is a SOAP message. Result is intended as a convenience for manipulating underlying data.

Result object has a status Code that indicates the return status of the API call. The enumeration of the status codes is listed in EVENT definition. A result object may contain actual result, partial result, or exceptional conditions. A corresponding formatting object is responsible for correctly interpreting the content.

```
public interface Result extends java.io.Serializable
{
        public GUID getId( ); //ID of the underlying event
    public String getStatusCode( );
        public Boolean isReference( ); //large result returned as reference
        public Object    getResultReference( );
        public double    getPercentDone( );
        public Node getDOM( ); //return content as DOM tree
        public String getXML( ); //return content as XML string
        public Hashmap getData( );//return content as name/value pairs
        ...
}
```

ResultBundle

ResultBundle is a simple collection interface of Result objects. The wire format of ResultBundle is multipart MIME data stream. ResultBundle is intended as a convenience for manipulating underlying data.

```
public interface ResultBundle extends java.io.Serializable
{
        public GUID getId( ); //result bundle ID
        public Result getResult(GUID eventId);
        public void celar( );
        public Vector getResults( );
        ...
}
```

Event Controller and Dispatcher

Event Controller and Dispatcher is mainly responsible for instantiating Event and EventBundle instances. It also interfaces with BOL and infrastructure event dispatching mechanism.

EventFactory

EventFactory is responsible for instantiating Event instances. The lifetime of the EventFactory coincides with Engine. To maximize the speed of event creation, the following optimization is implemented:
  direct DOM cloning
  an instance recycling and pooling mechanism
  serialization optimizations

```
public interface EventFactory
{
    public void init( );
    public void shutdown( );
    public Event createEmptyEvent(EventDefinition foo);
    //event parameters are filled with HTTP request parameters
    public Event createEvent(EventDefinition foo, HttpRequest req);
}
```

Event

Event object carries necessary information to complete an API call, which includes:
  a GUID;
  parameter name and values;
  requested return items;
  a flag to indicate whether to dispatch synchronously;
  a flag to indicate current event state.
  For BOL events, the SOAP envelope structure is identified by a special parameter named BARRA_SOAP.

```
public interface Event extends java.io.Serializable
{
        public final string BARRA_SOAP = "BARRA_SOAP";
        public final int PENDING    =    0; //never dispatched
        public final int DISPATCHED = 1; //already
        dispatched
        public final int RETRYING = 2; //failed at least once,
        retrying
        public final int COMPLETED = 3; //completed with a
        status code
        public GUID getId( ); //a guid that uniquely
        identifies the event
    public Boolean isSynchronous( );
        public Hashtable getParams( );
        public void setParam(String paramName, Serializable
        value);
        public void setStatus(int foo);
        public int getStatus( );
        ...
}
```

EventBundle

EventBundle interface is mainly a collection interface of events.

```
public interface EventBundle extends java.io.Serializable
{
    public GUID getId( );
    public void addEvent(Event e);
    public void celar( );
    public Vector getEvents( );
    public double getProgress( ); // in percentage, 75% return 75.0
    ...
}
```

EventHandler

EventHandler defines the common interface for event dispatching. For synchronous event dispatching, the execution context is the servlet thread. Because EventHandler has similar semantics to stateless session bean, a simple pooling mechanism may be implemented for most types of EventHandler classes.

```
public interface EventHandler
{
    public void onCreate( );
    public void onDestroy( );
        public Object handleEvent(Boolean isSynchronous, Event e)
    throws EventHandlerException;
}
```

BOLEventHandler

BOLEventHandler dispatches EventBundles rather than events.

```
public interface BOLEventHandler extends EventHandler
{
    public Object dispatch(EventBundle foo);
    public Object getProgress(GUID id);
    public void cancel(GUID id);
}
```

Its BOL counterpart is listed here for completeness. The final signature and implementation of the interface is determined by BOL.

```
public interface BOL_EventHandler
{
    public ByteBuffer dispatch(EventBundle foo);
        throws DispatchException;
    public ByteBuffer getProgress(GUID id);
    public void cancel(GUID id);
}
```

BOL makes a decision on whether to process an EventBundle locally or remotely. In general, BOL process an EventBundle remotely if any event in the bundle need to be processed remotely. The dispatch( ) method throws exceptions for recoverable conditions. Only FailedToAcquireResource is identified so far. HAL catches the exception and retry dispatch( ) a few more times before telling user that server is too busy. SOAP FAULT messages are returned for other conditions, e.g. in-progress, client errors, server errors.

Dispatching Non-BOL Events

Event dispatching is either blocking or non-blocking. Blocking means the servlet thread is blocked until dispatch method returns, which is generally not desirable. A separate dispatch thread can be used as a convenient mechanism to asynchronously dispatch non-BOL events. The latency due to the convoy problem is ~10 ms on Windows NT. It should be much less on other platforms due to different kernel scheduling philosophy.

Session

In general, an object that has session scope needs to be examined for synchronization issues. The choice of session persistence mechanisms need to taken into account plausible usage scenarios, and define quantifiable performance objectives.

Session Manager

SessionManager is responsible for creating, removing, locating, and migrating session instances. A reaper thread periodically removes expired sessions. A popular design in application servers on storing sessions is to use memory-resident cache, which is replicated within its replication group. For fault tolerance purpose, usually two physical servers are needed for each replication group.

```
public interface SessionManager
{
    public void init(FooPersistence bar);
    public void shutdown( );
    public void update(GUID sessionId);
    public Boolean validate(GUID sessionId);
    public Session create( );
    public void remove(Session foo);
    public Session get(GUID id);
```

```
    //get performance statistics such as
        DeactivationInterval,
    //cache-hit ratio, average and variance in refresh
        latency, etc
    public Hashmap getStatistics(Hashmap params);
    public void setReaperFrequency(int seconds);
    ...
}
```

Session

```
public interface Session extends java.io.Serializable
{
    public GUID getId( );
    public synchronized setVersion(long ver);
    public synchronized long getVersion( );
        public synchronized Enumeration getMismatch(Hashmap foo);
        public synchronized void destory( );
        public synchronized void deactivate( );
        public void setTimeOut(int seconds);
        public int getTimeOut( );
        public void accessed( );
        public Boolean expired( );
        public synchronized Object getParam(String key);
        public synchronized void setParam(String, Serializable);
        public synchronized Object getObject(GUID key);
        public synchronized void setObject(GUID key, Serializable value);
    ...
}
```

Utilities

GUIDGen

```
public interface GUIDGen
{
    public GUID generate( );
    public String toString(GUID foo);
    public GUID fromString(String foo);
    ...
}
```

WeakHashMap with an LRU Policy

Similar to java.util.WeakHashMap. The least recently used item will be discarded first.

```
public interface BrowserCapabilibties
{
    public String getBrowserName( );
    public int     getMajorVersion( );
    public int     getMinorVersion( );
    public int     getJavascriptVersion( );
    ...
}
```

HttpPostedFileHandler

HttpPostedFileHandler provide access to user uploaded file. In order to be invoked by the HTTP posting acceptor, implementation shall provide a JNI interface.

```
public interface HttpPostedFileHandler
{
    public void filePosted(String fileName);
    public long       getContentLength( );
    public String     getContextType( );
    public String     getContentEncoding( );
    public String     getFileName( );
    public InputStream getContent( );
    ...
}
```

MimeEncoder and MimeDecoder
Find a standard implementation that can efficiently handle very large MIME data set.

HttpHeaderWriter
Write browser specific HTTP headers, e.g. to control browser caching behavior.

SmtpHandler
Find a free JAVA implementation that supports MIME attachments.

SoapSerializer
A SOAP-Encoding serialization helper class.

```
interface SoapSerializer
{
    // signature depends on optimization details
    public void marshall(...);
}
```

TemplateFactory
TemplateFactory maintains a weak cache of parsed template page definitions, event definitions, and result data dictionaries. If a request for a template definition can not be satisfied from the cache, Template Factory retrieves it from persistent storage.

TemplateFactory interface provides access to templates and related configuration information. It encapsulates the underlying persistent mechanism. A weak cache of parsed definitions is consulted before calling persistence manager. Entity and Event and default page definitions are preloaded at application startup time.

```
public interface TemplateFactory
{
    public void init( );
    public void destroy( );
    public TemplatePage getPageDefinition(String uri);
    public ResultDictionary getResultDictionary (String uri);
    public EventDefinition getEventDefinition(String uri);
    ...
}
```

PageDefinition
PageDefinition interface provides access to a parsed PAGE definition.

```
public interface PageDefiniton
{
    public Document getDocument( );
```

-continued

```
    public Vector getEvents( );
    public Layout getLayout(Node foo);
    ...
}
```

EventDefinition
EventDefinition interface provides access to a parsed Event definition.

```
public interface EventDefinition
{
    public Document getDocument( );
    public String getMethod( );
    public Boolean isSynchronous( );
    public Enumeration getArgs( );
    ...
}
```

ResultDictionary
ResultDictionary interface provides access to a parsed result data dictionary. The result data dictionary is a view of the BOL data dictionary. It emphasizes on presentation related information. Physically it is stored as a set of separate XML files, one for each BOL operation.

```
public interface ResultDictionary
{
    public void init(Node foo); //navigation node in template
    public Document getDocument( );
    public Node getAttribute(String);
    public Enumeration getAttributes( );
    ...
}
```

TemplateProcessor
TemplateProcessor interface is the base interface for processing a page template. Derived interfaces include Formatter, XSLTProcessor, JspInclude, Form, etc.

```
public interface TemplateProcessor
{
    public void process(String uri, Hashmap results,
        HttpServletRequest request,
        HttpServletResponse response
    ) throws TemplateProcessorException;
    // gain access to helper such as toolboxes, layout, etc
    public Object getHelper(String foo);
}
```

Layout
Layout module is responsible for handling the layout instructions in a template definition. It generates the corresponding javascript and HTML fragments that implement the desired layout structures. Layout instructions can be nested. The scope semantics of a nested layout instruction is similar to that of a JAVA variable.

LayoutHandler
LayoutHandler defines the common callback interface for generating layout structural elements. Three basic layout events are defined:

startLayout: generate start tags, e.g. <table . . . >
doLayout: generate body tags, e.g. <tr><td> . . .
endLayout: generate end tags, e.g. </table>

Position and geometry parameters listed in the template page can be in, a) percentage, b) pixels, or c) absolute units.

```
public interface LayoutHandler
{
    public void init(String binding);
    public String startLayout(Hashmap params);
    public String doLayout(Hashmap params, int xIndex,
    int yIndex);
    public String endLayout(Hashmap params);
    ...
}
```

Layout Binding

Layout binding is designated by the layout attribute in the page template definition.

| Binding | Attribute | Interface | Implementation |
|---|---|---|---|
| Frame Layout | frame | FrameLayoutHandler | mandatory |
| Table Layout | table | TableLayoutHandler | mandatory |
| Page Flow Layout | flow | PageFlowLayoutHandler | mandatory |
| Null Layout | null | NullLayoutHandler | mandatory |
| Layered Layout | layer | LayeredLayoutHandler | postpone |
| MDI Frame Layout | mdi | MDILayoutHandler | postpone |

Navigation

Navigation module is responsible for interpreting the navigation structure declared in a template page, and generating the javascript and HTML fragments that implements the desired looks and navigational behaviors. Navigation defines the common interface for describing navigation structures. It has a collection interface to navigation link item. Calling to HTML( ) causes a traversal of the link item collection, and output browser-neutral (if possible) javascript and HTML fragments that implement the desired behavior.

```
public interface Navigation
{
    public String toHTML (BrowserCapabilites foo);
    public void init(Node foo); //navigation node in template
    public Enumeration getLinkItems( );
    ...
}
```

LinkItem

LinkItem defines the common interface for describing a hyperlink. The presentation related attributes in binding-specific, and is defined in the derived interfaces.

```
public interface LinkItem
{
    String toHTML (BrowserCapabilites foo);
    public String targetURI( );
    public String targetFrame( );
    public int index( );
    public int width( );
    public int height( );
    public String displayText( );
    public Boolean enabled( );
    public Boolean visible( );
    ...
}
```

Navigation Bindings

Navigation binding is designated by the navigation node in the page template definition.

| Binding | Description | Navigation Interface | Link Item Interface | Key |
|---|---|---|---|---|
| Tabbed Menu | Each linkItem is displayed as a tab. Clicking on a tab changes a frame's target to the linkItem's url. Can use swapping images or DHTML behaviors for mouse-over effect. | TabMenu | TabMenuItem | tab |
| Dropdown Combo List | The linkItems are displayed in a selection combo box. A selection change event changes a frame's target to the linkItem's url. | Dropdown | DropdownItem | dropdown |
| Tree View | Each linkItem is displayed as a treenode. Clicking on a node changes a frame's target to the linkItem's url. | Tree View | TreeViewItem | tree |
| ListView | Each linkItem is displayed as a list item. Clicking on a node chages a frame's target to the linkItem's url. | ListView | ListViewItem | list |
| Numbered List | Each linkItem is display as a number. Clicking on a number chages a frame's | PageList | PageItem | number |

-continued

| Binding | Description | Navigation Interface | Link Item Interface | Key |
|---|---|---|---|---|
| Toolbar | target to the linkItem's url. Used for pagination. Each linkItem is displayed as a image. Clicking on a image changes a frame's target to the linkItem's url. | Tool Bar | ToolbarItem | toolbar |
| Pulldown Menu | The classic pulldown menu. | Menu | MenuItem | menu |

Presentation

Figure 8:
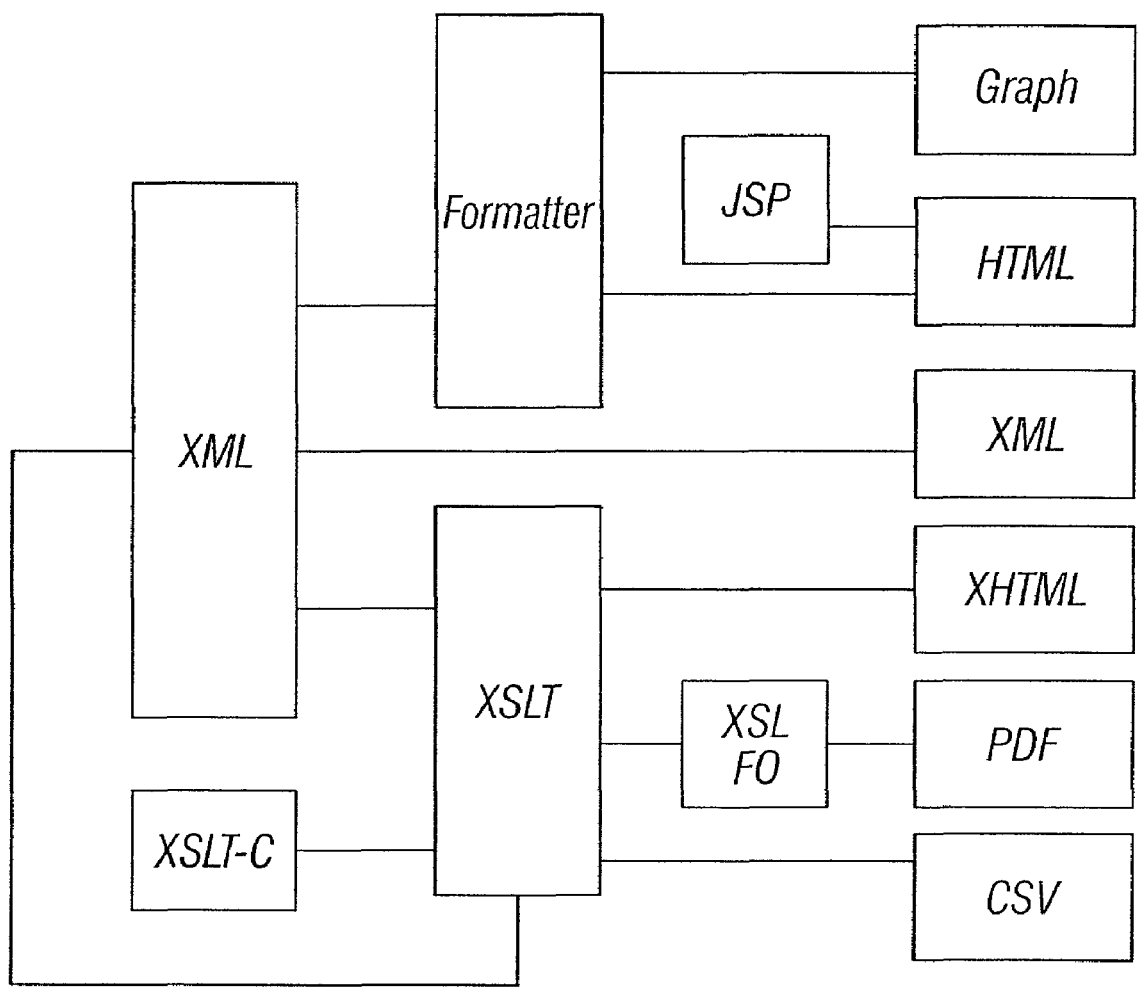
FIG. 8 is a block schematic diagram showing formatting mechanisms in a system for portfolio management and risk-analysis according to the invention.

Presentation module (see FIG. 8) is responsible for executing the presentation instructions in the template definition. There are three basic presentation mechanisms:

XSLT transformation, intended for transforming XML result sets to XHTML, XML, XSL FO, and CSV formats, Java formatting classes, intended for including output from jsp pages/servlets, generating graphs, or ad hoc transformations, XML passthrough intended for browsers support client-side XML transformation.

The motivations behind using XML as native result format include:

The bandwidth of XSLT transformation technologies have improved to acceptable level (~400 KB/CPU), and continue to improve.

The data is the API. Less interfaces to develop and maintain for both internal and external usage.

The data manipulation APIs and languages are W3C standards, which fits well with the modular construction design objective.

It makes pipelined rendering possible.

Formatter

Formatter defines the common interface for java formatting classes.

```
public interface Formatter extends TemplateProcessor
{
}
```

Derived Interfaces

| Interface | Description | Note |
|---|---|---|
| JspInclude | Include output from a JSP page in the output. | Need to provide a convenient way for the JSP page to locate the result object. |
| ServletInclude | Include output from a servlet page in the output. | Can not write HTTP headers in the servlet. |
| FileInclude | Include file content as-is in the output. | Need to define rules for certain html tags. |
| XSLTFormatter | Write XSLT transformation result to the output. | Several XSLTFormatter can be piped together. |
| PassThrough-Formatter | Write XML result directly to the output. | Can be used as an export mechanism. |
| XmlDataIsland- | Utilizes IE's xml data | Need to map fields in the |

-continued

| Interface | Description | Note |
|---|---|---|
| Formatter | island feature to generate tabular reports. | result data dictionary to xmldso fields. |
| GraphFormatter | Convert xml result to graphics files. | Only PNG for now. |

XSLTFormatter

XSLTFormatter uses compiled or standalone XSLT style sheets to transform XML content. Several XSLTFormattes can be used together to form a rendering pipeline. For example, an XML result set is first transformed into an XHTML grid output. The output is then piped through a second formatter, which change background color of grid to an alternating pattern. For another example, a form markup is first transformed into an XHTML form where the fields are filled with user input data. The form is transformed again to highlight validation errors.

The pipelining semantics is paint-over, i.e. newly applied styles overwrites existing styles.

```
public interface extends XSLTFormatter extends Formatter
{
    public void setXslSourceUri(String foo);
    public void setXsltcClass(String foo);
    public void setNextStage(XSLTFormatter bar);
    ...
}
```

PassThroughFormatter

PassThroughFormatter pass the input stream directly to the output.

If an XSLT style sheet uri is set, PassThroughFormatter inserts a reference to the XML result. The browser must support XSL transformation.

```
public interface PassThroughFormatter extends Formatter
{
    public void setXslSourceUri(String uri);
    ...
}
```

PagedResult

PagedResult is a wrapper over a BOL result object to implement paged views. The underlying storage can be either a file or XML stream.

```
public interface PagedResult extends java.io.Serializable
{
        public Result getResult( );
        public int setPageSize( );
        public int getPageSize( );
        public int getPageCount( );
        public int getPageNumber( );
        public Boolean firstPage( );
        public Boolean lastPage( );
        public Node getPageData(int page);
        public Enumeration getPageData(int page);
        public String getPageData(int page);
        ...
}
```

Special Output Formats

All special output formats may be generated using non-java components, provided:

The non-java 3rd party package offers irreplaceable functionalities, or

The non-java 3rd party package offers substantial price/performance advantage over java counter parts.

The non-java 3rd party package has much easier to use API.

If a non-java package does not provide a JNI interface, it shall be used out-of-process. Developing and maintaining custom JNI wrapper is discouraged unless the benefit significantly outweighs the cost.

Form

Model-View-Controller

The design of the Forms module follows the general industry trend of moving toward device independent markup of forms. The design follows the classical Model-View-Controller pattern:

A form's model is its data, processing logic, and validation constraints.

A view is a concrete interface representation.

The controller is a form template processor. It performs the house keeping tasks such as persisting intermediary states, transforming data among various formats, loading the next/previous page in a multi-page forms, etc.

The benefit of an MVC design is mainly the separation of purpose from presentation. Due to the large variance in the capabilities of the presentation devices, in this case the browsers, there is significant divergence in the implementation of complex views. It is therefore necessary to introduce some abstractions to localize the impact of browser difference. The abstractions introduced are kept at a minimum. In other words, the design tries to keep simple things simple, and makes hard things easier.

Form Elements

Simple forms are represented as HTML forms. Complex forms are represented in XML markup, and bound to either XHTML form or AWT applet at runtime.

Basic Elements

| Element | HTML binding | AWT binding |
| --- | --- | --- |
| button | <button> | java.awt.Button |
| checkbox | <input type="checkbox"> | java.awt.Checkbox |
| combobox | <select> | java.awt.Choice |
| hidden | <input type="hidden"> | java.awt.TextField |
| listbox | <input type="radio"> | java.awt.List |

-continued

| Element | HTML binding | AWT binding |
| --- | --- | --- |
| single line textbox | <input type="text"> | java.awt.TextField |
| mulit-line textbox | <textarea> | java.awt.TextArea |
| form | <form> | java.awt.Panel |

Hidden Fields

Following hidden fields may be inserted to each page in a complex form by a form template processor,

| Name | Description | Specific to multipage form | Optional |
| --- | --- | --- | --- |
| TEMPLATE | Template uri | n | y |
| BINDING | Form binding | n | y |
| PREVURI | Previous target uri | y | y |
| NEXTURI | Next target uri | y | y |
| PAGENUMBER | Current page number | y | n |

Form

Form interface defines the properties and methods needed for server-side form processing. When a form instance is initialized, it is bound to either XHTML or AWT. When bound to XHTML, the process( ) method writes out the form as XHTML and javascript fragments, possibly the highest level of html and javascript the browser can support. The scripts hook into the DOM event model to implement client-side behaviors that include:

DOM manipulation,

Data validation and conversion,

Highlighting,

Hide/show form elements,

Posting,

Limited calculations if server-side action is not necessary.

When bound to AWT, the process( ) method write out the form as either applet initialization parameters or as proprietary format specific to an applet initialization mechanism.

```
public interface Form extends TemplateProcessor
{
        public final int XHTML_BINDING = 0;
        public final int AWT_BINDING = 1;
        public void init (String uri, int binding, Hashmap params);
        public String getTemplateUri( );
        public FormState getFormSate( );
        public Boolean submittedFirstTime( );
        public Boolean muiltiPage( );
        ...
}
```

MultiPageForm

Multi-page forms are navigated either through Previous/Next button, and Numerical links. One of intended usage for MultiPageForm is to support wizard-type of interface.

```
public interface MultiPageForm extends Form
{
        public final int NUMBERING_PREVNEXT = 0;
        public final int NUMBERING_NUMBERICAL = 1;
```

```
                -continued
        public int getPageNumberingMode( );
        public Boolean firstPage( );
        public Boolean lastPage( );
        ...
}
```

FormElement

FormElement interface publishes the details of a form element markup.

```
public interface FormElement
{
    public void   init(Node foo, int binding, Haspmap params);
    public String toHTML( );
    public String getName( );
    public String getValue( );
    public int    getTabIndex( );
    public int    getWidth( );
    ...
}
```

FormState

Except for the most trivial forms where no validation error would occur, form states need to be persisted between HTTP requests. Form states shall be stored in the FormState object in an efficient serialization format. The lifetime a FormState object is the logical thread of execution of form submission, which is embodied in the underlying WorkItem.

```
public interface FormState extends java.io.Serializable
{
    public GUID getId( );
    public synchronized long getVersion( );
    public synchronized void getVersion(long);
    public synchronized void destory( );
    public synchronized void deactivate( );
    public void add(String id, FormStateItem foo);
    public void add(Enumeration foo);
    public void remove(String key);
    public void clear( );
    ...
}
```

FormStateItem public interface FormStateItem extends java.io.Serializable

```
public interface FormStateItem extends java.io.Serializable
{
    public String getName( );           //name of the underlying
                                        form element
    public String getPageIndex( );      //the index in a
                                        multipage form
    public void setValue(Serializable foo);   //element value
    public Serializable getVlaue( );
    public Boolean modified( );         //user modified the element
    public Boolean error( );            //invaid data input
    ...
}
```

Toolbox

Toolbox module publishes the interfaces to a collection of UI candies, which include style sheets, positioning helpers, graphics, data validation and conversion routines, etc.

Packaging

To reduce maintenance overhead and conserving bandwidth, reusable tools shall be packaged as separate files. For example, reusable javascript files shall be referenced as:

<script language="JavaScript" src="/tb/complex/treectrl.js"></script>

StyleTools

```
public interface StyleTools
{
    public String getStyle(Hashmap params) throws
        StyleToolsException;
    public String getFileUrl(String key);
    public void   initCollection(String url);
    ...
}
```

GraphicsTools

A lookup interface for accessing graphics resources, e.g. navigation gifs, icons, logos, etc.

```
public interface GraphicsTools
{
    public String getFileUrl(String key);
    public void   initCollection(String url);
    public int    getImageWidth(String key);
    ...
}
```

ConversionTools

A lookup interface for accessing data conversion routines, e.g. client-side date formatting, number formatting scripts, etc.

```
public interface ConversionTools
{
    public String getFileUrl(String key);
    public void   initCollection(String url);
    public String getConversionRoutine(String key);
    ...
}
```

ValidationTools

A lookup interface for accessing data validation routines, e.g. numerical input validation, data range validation scripts, etc.

```
public interface ValidationTools
{
    public String getFileUrl(String key);
    public void   initCollection(String url);
    public String getValidationRoutine(String key);
    ...
}
```

Complex UI Elements

The following browser UI elements are necessary. The implementation shall be parameterized to facilitate reuse.

| Element | Description |
| --- | --- |
| DatePicker | A parameterized JavaScript implementation of a date picker. |
| TreeCtrl | A parameterized JavaScript implementation of a treeview control. |
| ListCtrl | A parameterized JavaScript implementation of a listview control. |

Application

The Application component is a collection of application modules built on top of the Framework, BOL and infrastructure services that implement the system functional requirements. The Application component adopts a data-driven design pattern originally popularized by workflow and ERP applications. Specifically, the application workflow and presentation instructions are modeled as templates. Template is mostly declarative. XML is chosen as the binding because it's hierarchical, and high quality XML parsers are readily available.

SOAP Binding

SOAP Encoding is used as the wire protocol for both BOL API invocation and response. For example, a BOL event is:

```
<SOAP-ENV: Envelope
xmlns:SOAP-ENV="http://schemas.xmlsoap.org/soap/envelope/"
SOAP-ENV:encodingStyle=
"http://schemas.xmlsoap.org/soap/encoding/"/>
    <SOAP-ENV:Body>
        <barra:event id="foo"
        xmlns:barra="http://araneae.barra.com/schemas">
            <!-- event body goes here -->
        </barra: event>
    </SOAP-ENV:Body>
</SOAP-ENV:Envelope>
The BOL result looks like,
<SOAP-ENV:Envelope
```

-continued

```
xmlns:SOAP-ENV="http://schemas.xmlsoap.org/soap/envelope/"
SOAP-ENV:encodingStyle=
"http://schemas.xmlsoap.org/soap/encoding/"/>
    <SOAP-ENV:Body>
        <barra:result id="bar"
        xmlns:barra="http://araneae.barra.com/schemas">
            <!-- result body goes here -->
        </barra: result>
    </SOAP-ENV:Body>
</SOAP-ENV:Envelope>
```

Multipart MIME

BOL API invocation is through event dispatching. Events are dispatched in bundles. Results are returned in bundles. Both EventBundle and ResultBundle are encoded as multipart MIME data stream. The wire representation of a BOL event/result bundle is:

```
--BoundaryFoo
Content-Disposition: inline
Content-Type: text/xml; charset="utf-8"
Content-ID: <A_GUID>
Content-Description: a BOL event or result
<!-- First BOL request/result SOAP message goes here -->
--BoundaryFoo
Content-Disposition: inline
Content-Type: text/xml; charset="utf-8"
Content-ID: <A_GUID>
Content-Description: another BOL event or result
<!-- Second BOL request/result SOAP message goes here -->
--BoundaryFoo
```

PAGE Definition

A Page definition contains information on the structure, navigation, composition, exception handling, and presentation of the page. Personalization is achieved by overriding page definition. User overrides take precedence over organizational overrides, which in turn take precedence over Araneae defaults.

Definition

```
<xsd:schema xmlns:xsd="http://www.w3.org/2000/10/XMLSchema"
        targetNamespace="http://araneae.barra.com/schemas"
        xmlns:barra="http://araneae.barra.com/schemas"
        elementFormDefault="unqualified">
    <element name="page" type="PageType"/>
    <complexType name="PageType">
        <sequence>
            <element name="contents" minOccurs="0" type="Contents"/>
            <element name="events" minOccurs="0" type="Events"/>
            <element name="exceptions" minOccurs="0" type="Exceptions"/>
        </sequence>
        <attribute name="id" type="ID" use="required"/>
        <attribute name="uri" type="string" use="optional"/>
        <attribute name="layout" type="tns:layoutEnum" use="optional"/>
    </complexType>
    <complexType name="Contents">
        <sequence>
            <element   name="content" minOccurs="0"       maxOccurs="unbounded"
type="ContentRef"/>
        </sequence>
        <attribute name="id" type="ID" use="required"/>
        <attribute name="result" type="NMTOKEN" use="optional"/>
        <attribute name="layout" type="tns:layoutEnum" use="optional"/>
        <attribute name="nav" type="tns:navEnum" use="optional"/>
        <attribute name="width" type="string" use="optional"/>
        <attribute name="height" type="string" use="optional"/>
```

-continued

```
            <attribute name="xindex" type="integer" use="optional"/>
            <attribute name="yindex" type="integer" use="optional"/>
            <attribute name="zindex" type="integer" use="optional"/>
        </complexType>
        <complexType name="ContentRef">
            <sequence>
                <element name="fmt"  minOccurs="0"  maxOccurs="unbounded" type="Formatter" />
            </sequence>
        </complexType>
        <complexType name="Formatter">
            <attribute name="protocol" type="tns:formatEnum" use="required"/>
            <attribute name="param" type="string" use="required"/>
        </complexType>
        <complexType name="Events">
            <sequence>
                <element name="event" minOccurs="0" maxOccurs="unbounded" />
                    <complexType>
                        <attribute name="id" type="ID" use="required"/>
                        <attribute name="name" type="string" use="optional"/>
                    </complexType>
            </sequence>
        </complexType>
        <complexType name="Exceptions">
            <sequence>
                <element  name="exception" minOccurs="0"  maxOccurs="unbounded" type="Exception" />
            </sequence>
        </complexType>
        <complexType name="Exception">
            <sequence>
                <element        name="fmt" minOccurs="0"      maxOccurs="unbounded" type="Formatter"/>
            </sequence>
            <attribute name="code" type="string" use="requried"/>
            <attribute name="hint" type="string" use="optional"/>
        </complexType>
        <!-- more detailed type defintions ... -->
<xsd:schema>
```

Examples

```

<contents>
        <content id="HEAD">
            <fmt protocol="file"
            param="portfolio/workspace/head.html" />
        </content>
        <content id="BODY1" result="RESULT0104" >
            <fmt protocol="jsp"
            param="portfolio/workspace/port.jsp" />
        </content>
        <content id="BODY2" result="RESULT0507">
            <fmt protocol="xsl"
            param="portfolio/workspace/ws.xsl" />
            <fmt protocol="xsl"
            param="tools/painbrush/altenate.xsl" />
        </content>
        <!-- and so on ... -->
    </contents>
    <events>
        <event id="EVENT0213" name="updatePortfolio"/>
        <event id="EVENT0503" name="getPortfolioSummary"/>
        <event id="EVENT0507" name="getHoldings"/>
        <!-- and so on ... -->
    </events>
    <exceptions>
        <exception code="BOL401">
```

-continued

```
            <fmt protocol="xsl"
            param="portfolio/unauthorized.xsl" />
        </exception>
        <!-- and so on ... -->
    </exceptions>

```

EVENT Definition

An Event definition describes an API function published by the Business Object Layer. It contains three main parts:

Input parameters including strategy overrides, portfolio context,

Output parameters including the group by and sort by clauses,

Return results references.

Handlers of the return status codes are listed described in page definition. For a status code that does not have an explicitly declared handler, a default handler is used.

It is important to define event at the proper granularity.

Definition:
```xml
<xsd:schema xmlns:xsd="http://www.w3.org/2000/10/XMLSchema"
            targetNamespace="http://araneae.barra.com/schemas"
            xmlns:barra="http://araneae.barra.com/schemas"
            elementFormDefault="unqualified">
    <element name="event" type="EventType"/>
    <complexType name="EventType">
        <sequence>
            <element name="method" type="string"/>
            <element name="args" type="EventArgs"/>
            <element name="attrs" type="EventAttrs"/>
            <element name="groupby" minOccurs="0" type="EventGroupBy"/>
            <element name="sortby" minOccurs="0" type="EventSortBy"/>
            <element name="results" type="EventResults"/>
        </sequence>
        <attribute name="id" type="ID" use="required"/>
        attribute name="synchronous" type="Boolean" use="optional"/>
    </complexType>
    <complexType name="EventArgs">
        <sequence>
            <element name="arg" minOccurs="0" maxOccurs="unbounded">
                <complexType>
                    <attribute name="name" type="string" use="required"/>
                    <attribute name="type" type="string" use="required"/>
                </complexType>
            </element>
        </sequence>
    </complexType>
    <complexType name="EventAttrs">
        <sequence>
            <element name="attr" minOccurs="0" maxOccurs="unbounded">
                <complexType>
                    <attribute name="id" type="NMTOKEN" use="required"/>
                    <attribute name="aggr" type="string" use="optional"/>
                    <attribute name="type" type="string" use="optional"/>
                </complexType>
            </element>
        </sequence>
    </complexType>
    <complexType name="EventGroupby">
        <sequence>
            element name="attr" minOccurs="1" type="string" />
        </sequence>
    </complexType>
    <complexType name="EventSortby">
        <sequence>
            <element name="attr" minOccurs="1" maxOccurs="unbounded" type="string" />
        </sequence>
    </complexType>
    <complexType name="EventResults">
        <sequence>
            <element name="result" minOccurs="1" maxOccurs="unbounded">
                <complexType>
                    <attribute name="code" type="NMTOKEN" use="required"/>
                    <attribute name="hint" type="string" use="optional"/>
                </complexType>
            </element>
        </sequence>
    </complexType>
<xsd:schema>
```

Example

```xml
<xsd:schema xmlns:xsd="http://www.w3.org/2000/10/XMLSchema"
            targetNamespace="http://araneae.barra.com/schemas"
            xmlns:barra="http://araneae.barra.com/schemas"
            elementFormDefault="unqualified">
    <!-- include araneae type definitions -->
    <xsi:include
xsi:schemaLocation="http://araneae.barra.com/schemas/datatypes.xsd"/>
    <event id="EVENT0507" synchronous="false">
        <method>getHoldings</method>
```

-continued

```xml
        <args>
            <arg name="context" type="xsd:string"/>
            <arg name="zooming" type="xsd:string"/>
            <arg name="portfolio" type="xsd:string"/>
            <arg name="as_of" type="xsd:date"/>
            <arg name="benchmark" type="xsd:string"/>
            <arg name="numeraire" type="barra:currency"/>
            <!-- and so on ... -->
        </args>
        <attrs>
            <attr id="COUNTRY" aggr="count"
```

-continued

```
        name="Country" />
        <attr id="TICKER" aggr="count"
    name="Asset ID"/>
        <attr id="NAME" aggr="count" name="Name" />
        <attr id="PRICE" aggr="wAvg" name="Price" />
        <attr id="WEIGHT" aggr="sum" name="Weight" />
        <attr id="MCTR" aggr="risk" name="MC-Risk" />
        <!-- and so on ... -->
    </attrs>
    <groupby>
        <attr>COUNTRY<attr>
    </groupby>
    <sortby>
        <attr>COUNTRY<attr>
            <attr>TICKER<attr>
        <sortby>

<result code="BOL200" hint="Success" />
            <result code="BOL201" hint="Resource Allocated,
            Processing" />
            <result code="BOL202" hint="Request Accepted,
            Pending" />
            <result code="BOL401" hint="Unauthorized"/>
            <!-- and so on ... -->

</event>
<xsd:schema>
```

Result Data Dictionary

Result Data Dictionary is a view on BOL data dictionary. It lists the data type and other information necessary for interpreting and presenting BOL results.

Definition:
```
<xsd:schema xmlns:xsd="http://www.w3.org/2000/10/XMLSchema"
            targetNamespace="http://araneae.barra.com/schemas"
            xmlns:barra="http://araneae.barra.com/schemas"
            elementFormDefault="unqualified">
    <element name="ResultDictionary"
    type="ResultDictionaryType"/>
    </element>
    <complexType name="ResultDictionaryType">
        <sequence>
            <element  name="attrgroup" minOccurs="1"
            maxOccurs="1"
type="AttrGroup"/>
        </sequence>
        <attribute name="id" type="ID" use="required"/>
        <attribute name="uri" type="string" use="optional"/>
    </complexType>
    <complexType name="AttrGroup">
        <sequence>
            <element name="attr" minOccurs="0"
            maxOccurs="unbounded">
                <complexType>
                    <attribute name="id" type="NMTOKEN"
                    use="required"/>
                    <attribute name="type" type="string"
                    use="required"/>
                    <attribute name="hint" type="string"
                    use="optional"/>
                </complexType>
            </element>
        </sequence>
    </complexType>
</xsd:schema>
```

Examples

```
<xsd:schema xmlns:xsd="http://www.w3.org/2000/10/XMLSchema"
        targetNamespace="http://araneae.barra.com/schemas"
        xmlns:barra="http://araneae.barra.com/schemas"
        elementFormDefault="unqualified">
    <!-- include araneae type definitions -->
    <xsi:include
xsi:schemaLocation="http://araneae.barra.com/schemas/datatypes.xsd"/>
    <xsd:annotation>
        <xsd:documentation>
            Sample Result Data Dictionary Definition
        </xsd:documentation>
    </xsd:annotation>
    <result id="RESULT0507" uri="/porfolio/holdings" >
        <attrgroup id="HOLDING">
            <attr id="TICKER" type="xsd:string" hint="Asset Ticker" />
            <attr id="SHARE" type="xsd:float" hint="Holding Amount" />
            <attr id="CLASS" type="barra:assetClass" hint="Asset Class" />
            <attr id="CURRENCY" type="barra:currency" hint="Currency" />
            <attr id="MCTR" type="xsd:double"
                                    hint="Marginal Contribution to Risk"/>
            <!-- and so on ... -->
        </attrgroup>
    </result>
</xsd:schema>
```

Special Definitions

Datatypes

Datatypes is a special view on the data type definition part of the BOL data dictionary. The above template examples referenced the following schema definition.

```
<xsd:schema xmlns:xsd="http://www.w3.org/2000/10/XMLSchema"
            targetNamespace="http://araneae.barra.com/schemas"
            xmlns:barra="http://araneae.barra.com/schemas"
            elementFormDefault="unqualified">
    <xsd:simpleType name="assetClass">
        <xsd:restriction base="xsd:string">
            <xsd:enumeration value="equity"/>
            <xsd:enumeration value="fixed income"/>
            <xsd:enumeration value="cash"/>
            <xsd:enumeration value="futures"/>
            <!-- and so on ... -->
        </xsd:restriction>
    </xsd:simpleType>
    <xsd:simpleType name="currency">
        <xsd:restriction base="xsd:string">
            <xsd:pattern value="[A-Z]{3}"/>
        </xsd:restriction>
    </xsd:simpleType>
    <!-- and so on ... -->
</xsd:schema>
```

BOL Exception

BOL Exception describes details of a recoverable BOL fault condition. The most likely fault reason is due to client error. A BOL exception looks like (in wire representation),

```
<SOAP-ENV:Envelope
    xmlns:SOAP-ENV="http://schemas.xmlsoap.org/soap/envelope/">
    <SOAP-ENV:Body>
        <SOAP-ENV:Fault>
            <faultcode>SOAP-ENV:Client</faultcode>
            <faultstring>Client Error</faultstring>
            <detail>
                <barra:faultdetails
```

```
            xmlns:barra=
            "http://araneae.barra.com/schemas" >
        <code>BOL401</code>
        <hint>Write access denied.</hint>
            <user>Clerk Joe<hint>
            <portfolio>SP100<portfolio >
        </barra:faultdetails>
    </detail>
  </SOAP-ENV:Fault>
 </SOAP-ENV:Body>
</SOAP-ENV:Envelope>
```

Modules

General Process Flow

Figure 9A:
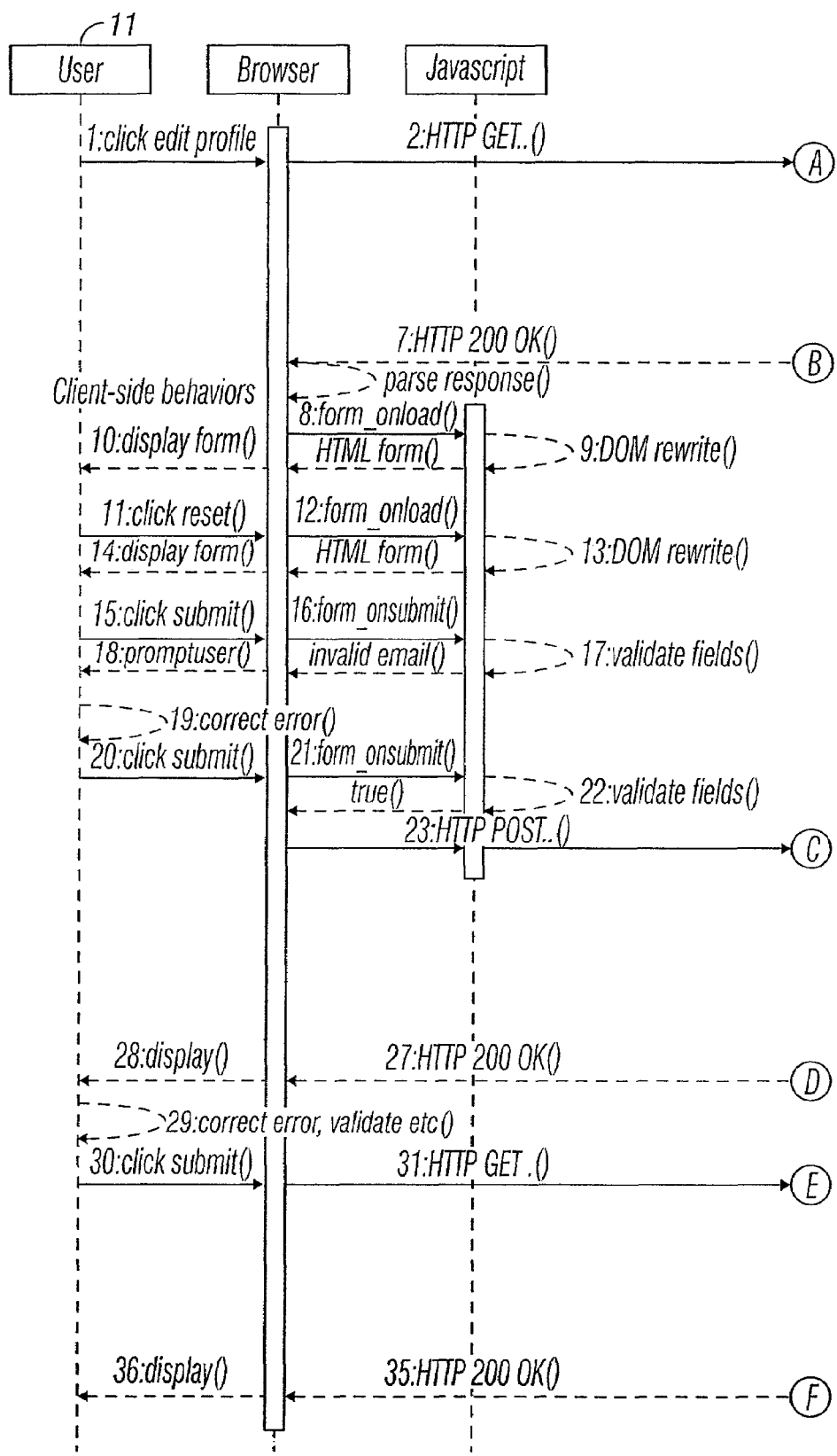
FIG. 9 is a flow diagram showing a processing sequence for an edit profile screen in a system for portfolio management and risk-analysis according to the invention.
Figure 9B:
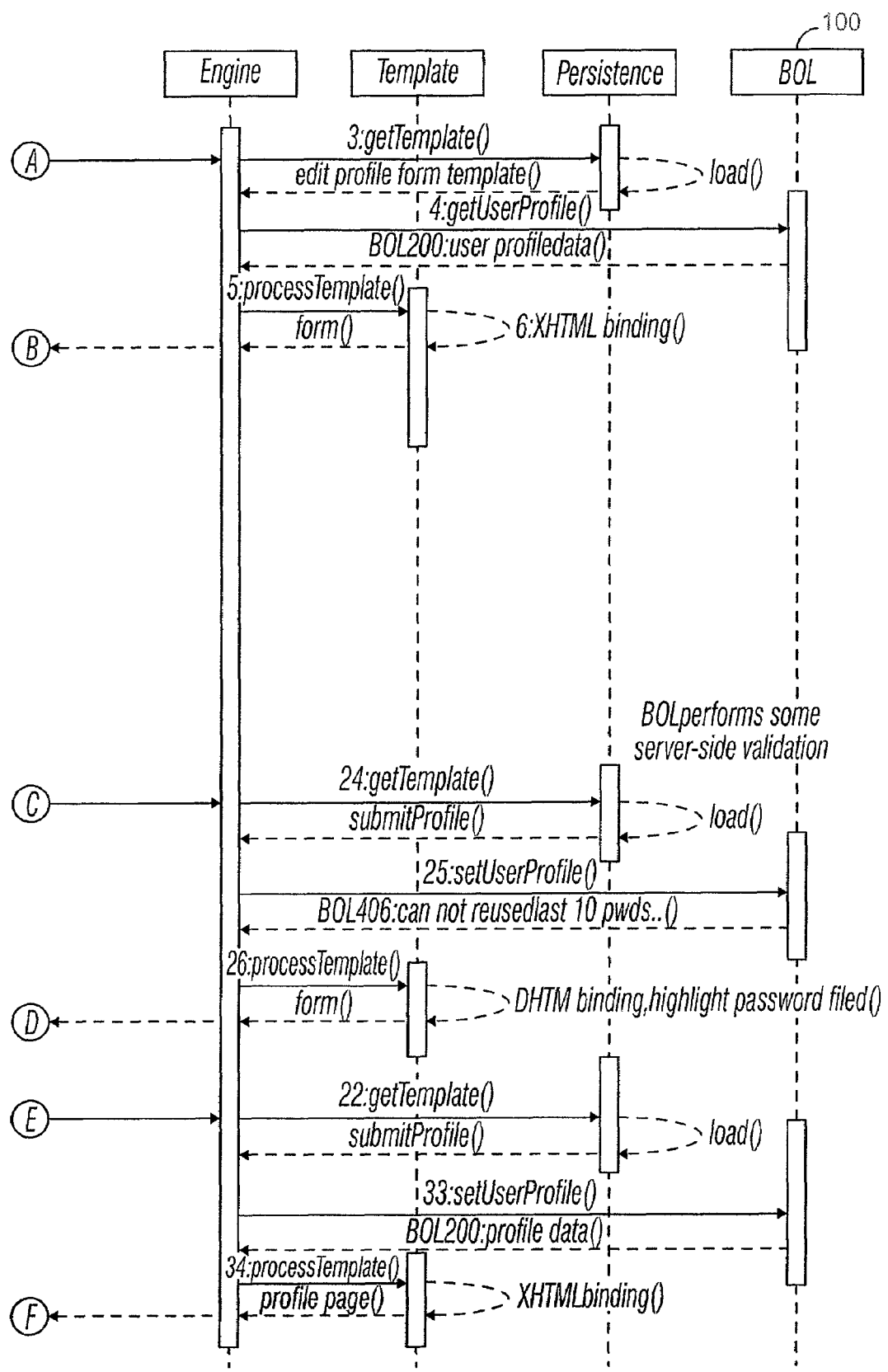

FIG. 9 illustrates the typical processing flow of a functional module. Note that the logical thread of execution consists of both client-side and server-side activities. General activities such as validating session, parsing template, dispatching events, collection results and logging activities are handled by the Frame component. Module specific activities are described in the template definitions and executed either by generic or specialized template processors. The implementation of a functional module is primarily an exercise of data and presentation modeling. For each module, before implementation starts define:
  event definitions,
  result formats and data dictionaries, if any,
  page definitions,
  module-specific session variables,
  extraordinary presentation requirements, if any,
  module-specific error handlers, if any,

SOAP

SOAP (Simple Object Access Protocol) is an XML based lightweight communication protocol. It has two main parts: SOAP Envelope (an application layer protocol), and SOAP Encoding (a presentation layer protocol). This design document has adopted SOAP Encoding rules for expressing instances of application-defined datatypes, as well as representing BOL calls and responses.

SOAP messages are fundamentally one-way transmissions from a sender to a receiver, and are often combined to implement patterns such as request/response.

Grammar

A SOAP message is an XML document that consists of a mandatory SOAP envelope, an optional SOAP header, and a mandatory SOAP body. It should include the proper SOAP namespace on all elements and attributes, and must not contain DTD or XML processing instructions.

Envelope

The element name is "Envelope". The element MUST be present in a SOAP message. The element MAY contain namespace declarations as well as additional attributes. If present, such additional attributes MUST be namespace-qualified. Similarly, the element MAY contain additional sub elements. If present these elements MUST be namespace-qualified and MUST follow the SOAP Body element.

Header

The element name is "Header". The element MAY be present in a SOAP message. If present, the element MUST be the first immediate child element of a SOAP Envelope element. The element MAY contain a set of header entries each being an immediate child element of the SOAP Header element. All immediate child elements of the SOAP Header element MUST be namespace-qualified. Header attributes can be used to instruct how a recipient of a SOAP message should process it. For example, the SOAP must understand global attribute can be used to indicate whether a header entry is mandatory or optional for the recipient to process.

Body

The element name is "Body". The element MUST be present in a SOAP message and MUST be an immediate child element of a SOAP Envelope element. It MUST directly follow the SOAP Header element if present. Otherwise it MUST be the first immediate child element of the SOAP Envelope element. The element MAY contain a set of body entries each being an immediate child element of the SOAP Body element. Immediate child elements of the SOAP Body element MAY be namespace-qualified. SOAP defines the SOAP Fault element, which is used to indicate error messages. The body element carries the payload of a SOAP message, e.g. RPC parameters or error reporting. The SOAP Fault element is used to carry error and/or status information within a SOAP message. If present, the SOAP Fault element MUST appear as a body entry and MUST NOT appear more than once within a Body element. A Fault element defines four sub-elements: faultcode, faultstring, faultactor, detail.

SOAP Encoding

SOAP type system is a generalization of the common features found in type systems in programming languages, databases and semi-structured data. A type either is a simple (scalar) type or is a compound type constructed as a composite of several parts, each with a type.

Simple Types

For simple types, SOAP adopts all the types found in the section "Built-in datatypes" of the "XML Schema Part 2: Datatypes" Specification, both the value and lexical spaces.

Compound Types

SOAP allows two structural patterns.

SOAP array behaves like java object array. An array may contain an arbitrary mixtures of types can be contained unless specifically limited by use of the arrayType attribute. SOAP also defines encoding rules for multi-dimensional array, sparse array, and partially transmitted arrays. Refer to the specification for details. It is important to note that none of current implementations of SOAP support all SOAP encoding rules. It is prudent to use the simplest data structure sufficient for the purpose.

Session Implementation

Session must behave well in a cluster environment, e.g. states must be able to migrate quickly among cluster members. Session must encapsulate its state management mechanism, which can be memory-base, file-based, DBMS based, or a mixture of these. Session must encapsulate its partitioning mechanism. Session ID is the only identifier need to locate session states. The physical location of the states shall be encapsulated. Session must be fault-tolerant. Partitions of session states should remain available when a server fails.

Object Serialization

Following strategies can be used to enhance object serialization in java:
  override readObject( )/writeObject( )
  use JNI for type conversion to/from byte stream
  write slim type information
  use better stream buffering
  override the behaviors of internal hash map used by JDK
    for object serialization A combination of these can achieve an order of magnitude speed improvement over default serialization.

BOL

The scope of the BOL includes all of the business logic in THE SYSTEM. It also includes some infrastructure specific to its own implementation. It excludes general infrastructure services and presentation.

servers to historical datasets or computational operations.

Architecture

Figure 10:
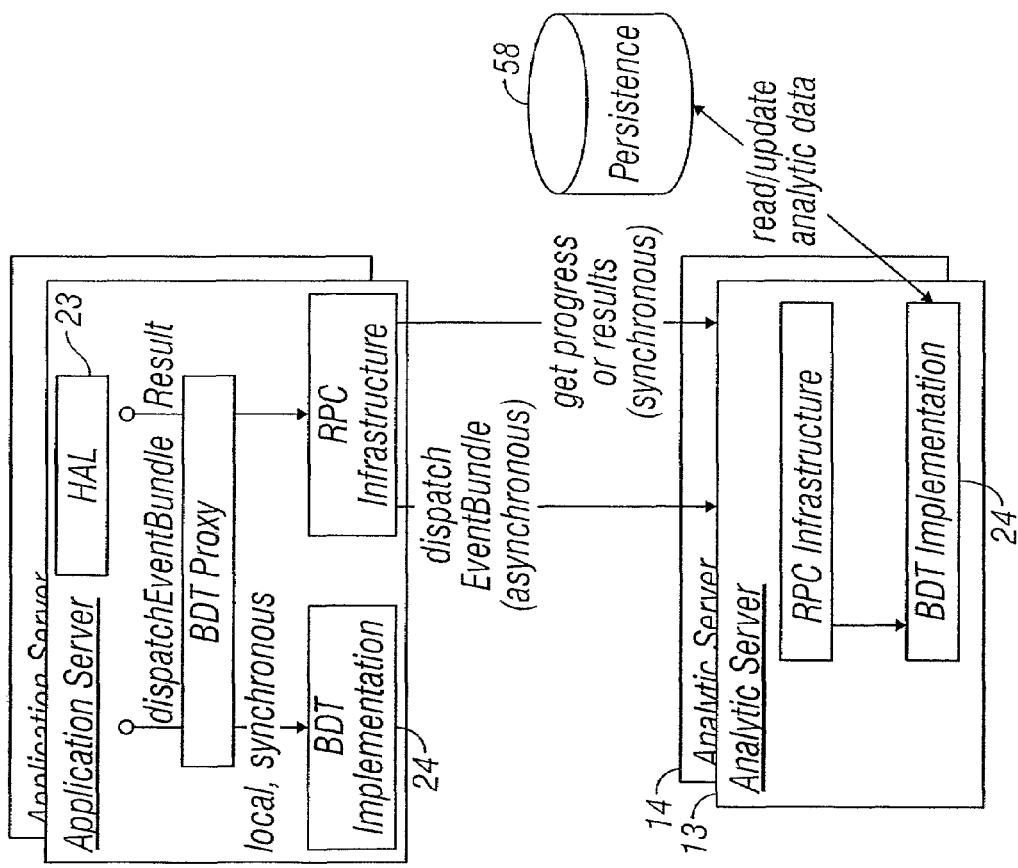
FIG. 10 is a block schematic diagram showing physical deployment of a BDT in a system for portfolio management and risk-analysis according to the invention.

FIG. 10 shows the physical deployment of components of BOL, and their interaction with HAL, Persistence and Infrastructure services.

RPC Infrastructure

This component is responsible for managing remote EventBundle invocation and progress monitoring.

Components

Figure 11:
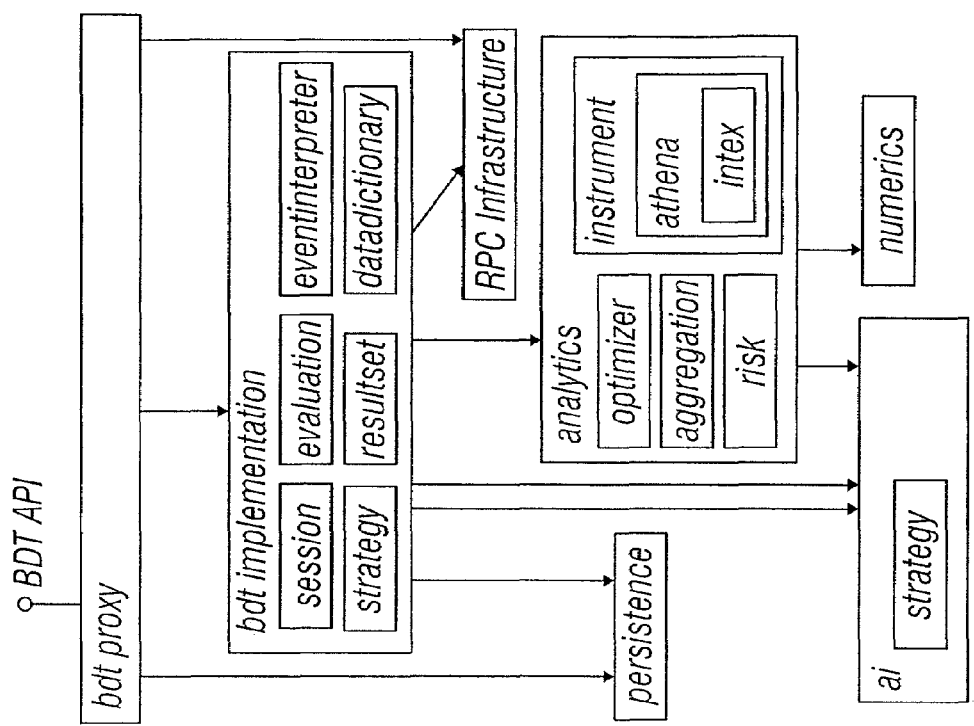
FIG. 11 is a block schematic diagram showing BOL component relationships in a system for portfolio management and risk-analysis according to the invention.

FIG. 11 shows two kinds of relationship—dependency (an arrow means "depends on"), and containment (indicated by nesting).

BDT API: BDT exposes the interfaces called by HAL. Users of a Hosted Implementation may also call these interfaces, but they are more likely to call an alternative interface that is method-based. (Public BDT API, TBD).

bdt proxy: The bdt proxy analyses Event Bundles for both local and remote, asynchronous evaluation via the RPC infrastructure.

bdt.eventinterpreter: Decides how to evaluate events, by using dependency analysis in conjunction with bdt.datadictionary, and interpreting attributes such as aggregation method. User-defined formulae is also the responsibility of this component.

bdt.evaluation: Includes public method implementations at the granularity of events, and private implementations at a finer level of granularity. Events are evaluated in threads belonging to the RPC infrastructure.

bdt.session: bdt.session is responsible for managing the lifetime of the Persistent Session State, and providing access to it.

bdt.result: This component is responsible for managing resultsets (cursored and otherwise) and progress monitoring.

bdt.datadictionary: This component provides definitions of data items that are referred to in the requests and results in the bdt interface.

bdt.strategy: bdt.strategy manages information defined as strategy, and implements the strategy defaulting rules.

ai (analytic interfaces): Analytic interfaces. A set of interfaces that represents all data abstractions that are used in analytic routines.

BDT API

The BDT API is the only point of entry to the BOL layer.

Event Bundle and Result Bundle are both MIME-encoded. The GUID (which is generated by HAL) is stored in a custom header of the Event Bundle. This GUID is used to identify the Event Bundle in calls to getProgress( ) and cancel( ). The contents of an Event Bundle are SOAP invocations. The contents of a Result Bundle are one of:

- a list of results corresponding to those SOAP invocations that return results.
- one SOAP status message that reports the progress of the whole bundle, as a percentage complete.
- one SOAP status message that reports a predefined failure code and text description of the reason.

HAL calls the dispatch( ) method, then the getProgress( ) method zero or more times, until the returned Result Bundle contains either an error or a list of results. HAL does not call getProgress( ) for the same GUID after the final Result Bundle is returned. If the error is recoverable, e.g. compute resource not available, HAL retries the whole event bundle.

bdt proxy bdt.proxy implements the bdt interface. The bdt proxy is responsible for analysing Event Bundle to decide between local and remote evaluation and invocation of bdt.eventinterpreter.

bdt.proxy implements the BDT API, described above.

Event Locality bdt.proxy determines, according to configuration that is changeable at run-time, whether to evaluate event bundles locally or remotely. Local vs. remote is a run-time configurable property of an Event definition. A configuration interface exists for administrative, testing and tuning purposes. This interface also exists in a Hosted Araneae Implementation, but it may not be exposed.

Event Bundle Analysis

Event Bundles define the ordering of the Events that they contain. BOL analyses the Event Bundle to determine if any of the events should be evaluated remotely. If one or more events should be evaluated remotely, the whole bundle is evaluated remotely.

Progress Monitoring and Persistence bdt.proxy accesses a subset of the PSS that is concerned with persisting results and tracking progress. The PSS records the preferred server, i.e. the server that new requests is preferentially directed to, and the responsible server for each outstanding request. Calls to the getProgress( ) method are directed via the RMI Infrastructure, to the responsible server if the request is still in progress. After the request is complete, the Result Bundle may be persisted—in this case, a call to the getProgress( ) method is fulfilled without referring to the responsible server because all of the data is available in the PSS. All results in a Result Bundle are returned with the final getProcess( ) call. Results may be persisted independently of the Result Bundle that contains them if they are large. In this case, the Result Bundle contains a reference to the location of the result in persistent store, and HAL is responsible for destroying them.

HAL uses Event Definitions to ensure that the named arguments stored each Event instance are of the correct type, and that mandatory arguments are present. Event Handler implementations are checked against the corresponding Event Definitions, if possible at build time or deployment time.

bdt.eventinterpreter

Decides how to evaluate events, by using dependency analysis in conjunction with bdt.datadictionary, and interpreting attributes such as aggregation method. User-defined formulae are also the responsibility of this component. bdt.eventinterpreter is invoked by the Computation Engine.

The Events that bdt.eventinterpreter handles are actually SOAP invocations, which are tunneled through an Event Bundle. Predefined Query Events are dispatched to the corresponding Event Handler for evaluation. Configurable Query Events specify a list of required data, with attributes such as zooming behavior, aggregation method, filtering and grouping. bdt.eventinterpreter is responsible for ensuring that the appropriate risk, lookup and aggregation operations are performed, and that the results are appropriately formatted.

bdt.evaluation

This component contains the code that actually evaluates the events. This is the actual business logic—everything else is plumbing or supporting libraries. The RPC Infrastructure invokes methods in this component. bdt.evaluation contains implementations of bdt.EventHandler, such as CalcRiskSummary. These classes use supporting classes in analytics.risk, such as RiskCalculator and FactorExposures. This component has a factory interface. bdt.proxy or bdt.eventinterpreter instantiates objects that implement bdt.EventHandler and call invoke( ).

The clients of bdt.evaluation are bdt.proxy and the bdt.eventinterpreter. bdt.evaluation uses analytics.risk to perform risk computations.

bdt.session

This component manages access to the Persistent Session State. The lifetime of a bdt.session object starts at user logon and ends at user logout or session timeout. In other words, it corresponds to an HTTP session. For correctness, a new session should be cloned when the user opens a new browser window, but this may be impossible to achieve, or may call for unnatural techniques in the browser. Sessions are identified by SessionIDs, which are assigned at logon time.

bdt.datadictionary bdt.datadictionary provides definitions of data items that are referred to in the requests and results in the bdt interface.

bdt.strategy

Strategy settings are associated with portfolios, users and current browser selection. The functional spec defines a complex set of rules for supplying default values according to a hierarchy of precedence. As the user navigates, the strategy must be modified or reloaded. In this discussion, "strategy" means a group of settings that are defined for one source (such as "portfolio tree node"). "Total strategy" means the result of combining all strategies from applicable sources according to the defaulting rules.

AI (Analytic Interfaces)

The AI package consists of java interface definitions only. The purpose of AI is to break the dependency cycle that would otherwise exist between the event handler implementations in BDT and the analytics packages. The interfaces that constitute the AI are data abstractions, for example TermsAndConditions, Holding, Portfolio and CovarianceMatrix.

analytics.risk

Risk computations are implemented from scratch in Java, possibly with the help of off-the-shelf libraries for matrix arithmetic. They are implemented in a thread-safe way, so that they can be used in the thread pool of the RPC Infrastructure. The granularity of the classes and methods is chosen so that locally cached intermediate results can be reused.

analytics.optimizer

The existing optimization library (OptSrvmn.dll) is used. Because the optimizer is not thread-safe, it must be run in a group of separate processes. If optimizations are at the level of granularity of an Event, they are tagged as optimizations in the message queue and evaluated by analytic server processes that are dedicated to optimization.

analytics.instrument.athena

The Athena library computes prices and exposures to fixed income factors for Cash Flow Instruments. In many cases, prices and exposures of CFIs are recomputed in batch processes at regular times, usually after new market data is available.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method containing program code executable by a processor for managing a portfolio of assets and analyzing risk for each asset, the method comprising the steps of:
    inputting a user's assets into a computer comprising an N-layer framework, said N-layer framework comprising a plurality of components that share a plurality of distributed data objects, wherein said assets comprise at least one type of data object;
    storing said distributed data objects in a TSpace component, said TSpace component comprising a database for temporary storage of said distributed data objects and a means for providing a single data object to multiple components in said N-layer framework; and
    using said N-layer framework to perform the following steps:
        organizing and categorizing said user's assets as a type of investment to reflect a user's investment process;
        determining risk assumed for each of said user's investments;
        determining sources of risk for each of said user's investments;
        analyzing each of said user's investments for risk exposures;
        identifying and quantifying sources of volatility for each of said user's investments;
        analyzing trading scenarios for each of said user's investments;
        building a plurality of customized risk analyses and reports, said reports covering a plurality of asset classes and a plurality of markets; and
        allowing said user to define different levels of risk for display for each investment based on said customized risk analyses and reports.

2. The computer implemented method of claim 1, wherein each layer of said N-layer framework processes data and provides said data to any layers above it; and
    wherein lower layers are tested independently of any higher layer.

3. The computer implemented method of claim 1, said N-layer framework comprising:
    a user agent (UA) layer for gathering a user input and rendering a server response;
    an HTTP application layer (HAL);
    a business object layer (BOL);
    an analytics layer (AL);
    an infrastructure services (IS) layer; and
    a data access (DA) layer.

4. The computer implemented method of claim 3, further comprising said UA layer transmitting requests to said HAL.

5. The computer implemented method of claim 4, further comprising said HAL interpreting said UA HTTP requests and transmitting said requests to different subsystems.

6. The computer implemented method of claim 3, further comprising said BOL dispatching a plurality of events comprising a plurality of business operations and their associated input/output data that are stored as part of a template associated with a request, and invoking said BOL to perform strategy, distributed analysis, and risk calculations.

7. The computer implemented method of claim 3, further comprising said AL receiving calls from said BOL and invoking any of libraries and analytics to perform calculations for said BOL.

8. The computer implemented method of claim 3, further comprising said IS layer performing distributed processing, including any of remote method distribution, load balancing, batch job management, data access, and transferring data to computer readable cache memory.

9. The computer implemented method of claim 7, said AL further comprising:
a plurality of analytics engines for generating a plurality of results that are synchronized in each layer of said N-layer framework.

10. The method of claim 9, further comprising said AL synchronizing said plurality of results in said analytics engines when processing is complete.

11. The computer implemented method of claim 9, further comprising said AL synchronizing data for a plurality of market conditions in said analytics engines in response to inputting new data for a plurality of market conditions.

12. The computer implemented method of claim 3, further comprising said AL determining which calculations are to be carried out locally and which calculations are to be distributed to a remote machine.

13. The computer implemented method of claim 3, further comprising said AL calculating risk with a risk calculator.

14. The computer implemented method of claim 3, wherein said AL comprises:
a plurality of analytics engines that are specialized, based on criteria that includes at least one of: current analysis, historical analysis, risk, optimization, and fixed income exposures calculations.

15. The computer implemented method of claim 14, wherein said AL comprises:
a plurality of analytics objects that comprise interfaces used by said analytics library to obtain information for a calculation.

16. The computer implemented method of claim 14, wherein said AL comprises:
risk analytics for performing risk computations.

17. The computer implemented method of claim 14, further comprising said AL performing pricing and exposure computations.

18. The computer implemented method of claim 3, further comprising said IS layer coordinating periodic tasks, as well as long running tasks, remotely scheduling jobs, canceling jobs, and checking on job status;
processing tasks that require more than a single resource to complete and for distributing a load using available resources;
coordinating different sub-tasks that complete a master task;
balancing loads; and
facilitating a contact point for all upper layers.

19. The computer implemented method of claim 3, wherein said DA layer comprises:
long term durable persistence;
shared temporary persistence; and
a cache.

20. The computer implemented method of claim 1, further comprising the step of:
inputting at least one of a user's income, holdings, asset classes, cash, futures, priorities, strategy, and risk preferences.

21. The computer implemented method of claim 1, further comprising the step of:
integrating asset classes, wherein a user performs at least one of managing equity, fixed income, and a blend of both equity and fixed income.

22. The computer implemented method of claim 1, further comprising the step of:
aggregating portfolios; and
displaying portfolios with multiple levels of aggregation, wherein each level of aggregation is associated with risk and its underlying sources.

23. The computer implemented method of claim 1, further comprising:
updating the portfolio with user-specific data.

24. An apparatus comprising:
a processor;
a communication device coupled to said processor and adapted to communicate via a communication network; and
a storage device in communication with said processor and storing instructions adapted to be executed by the processor to:
input a user's assets into a computer comprising an N-layer framework, said N-layer framework comprising a plurality of components that share a plurality of distributed data objects, wherein said assets comprise at least one type of data object;
store said distributed data objects in a TSpace component, said TSpace component comprising a database for temporary storage of said distributed data objects and a means for providing a single data object to multiple components in said N-layer framework; and
use said N-layer framework to perform the following steps:
organizing and categorizing said user's assets as a type of investment to reflect a user's investment process;
determining risk assumed for each of said user's investments;
determining sources of risk for each of said user's investments;
analyzing each of said user's investments for risk exposures;
identifying and quantifying sources of volatility for each of said user's investments;
analyzing trading scenarios for each of said user's investments;
building a plurality of customized risk analyses and reports, said reports covering a plurality of asset classes and a plurality of markets; and
allow said user to define different levels of risk for display for each investment based on said customized risk analyses and reports.

* * * * *